(12) United States Patent
Ghaleb et al.

(10) Patent No.: US 11,126,526 B2
(45) Date of Patent: *Sep. 21, 2021

(54) METHOD INCLUDING COLLECTING AND QUERYING SOURCE CODE TO REVERSE ENGINEER SOFTWARE

(71) Applicant: KING FAHD UNIVERSITY OF PETROLEUM AND MINERALS, Dhahran (SA)

(72) Inventors: Taher Ahmed Ghaleb, Dhahran (SA); Khalid Abdullah Aljasser, Dhahran (SA); Musab A. Alturki, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,127

(22) Filed: Jan. 31, 2020

(65) Prior Publication Data

US 2020/0210306 A1     Jul. 2, 2020

Related U.S. Application Data

(63) Continuation of application No. 16/045,090, filed on Jul. 25, 2018, now Pat. No. 10,552,286.

(51) Int. Cl.
*G06F 11/32* (2006.01)
*G06F 8/41* (2018.01)
(Continued)

(52) U.S. Cl.
CPC ............. *G06F 11/323* (2013.01); *G06F 8/20* (2013.01); *G06F 8/427* (2013.01); *G06F 8/74* (2013.01)

(58) Field of Classification Search
CPC .......... G06F 11/323; G06F 8/74; G06F 8/427; G06F 8/20
(Continued)

(56) References Cited

U.S. PATENT DOCUMENTS 5,963,739 A * 10/1999 Homeier ............. G06F 11/3608
                                                        714/E11.209
6,199,198 B1   3/2001 Graham
(Continued)

FOREIGN PATENT DOCUMENTS

CN     103336760 A    10/2013
CN     104391706 A     3/2015
CN     104751053 A     7/2015

OTHER PUBLICATIONS

Matthias Merdes, et al., "Experiences with the Development of a Reverse Engineering Tool for UML Sequence Diagrams: A Case Study in Modern Java Development", Conference Paper, Jan. 2006, pp. 125-134.
(Continued)

*Primary Examiner* — Marina Lee
(74) *Attorney, Agent, or Firm* — Oblon, McClelland, Maier & Neustadt, L.L.P.

(57) ABSTRACT

A computer-implemented method includes: collecting, by a processor of a computer, analysis information from a source code of a computer program; tracing, by the processor of the computer, program behavior starting with a main entry point to produce trace data; and visualizing, by the processor of the computer, the trace data as a sequence diagram, wherein the trace data comprises a representation corresponding to a sequence diagram.

8 Claims, 14 Drawing Sheets

(51) Int. Cl.
 *G06F 8/20* (2018.01)
 *G06F 8/74* (2018.01)
(58) Field of Classification Search
 USPC .................. 717/124–135, 105, 109, 113
 See application file for complete search history.

(56) References Cited

U.S. PATENT DOCUMENTS

| | | | |
|---|---|---|---|
| 7,681,182 | B1 | 3/2010 | Mistry et al. |
| 9,424,003 | B1 | 8/2016 | Neumann |
| 9,792,443 | B1* | 10/2017 | Sheridan ............... G06F 21/577 |
| 10,552,286 | B1* | 2/2020 | Ghaleb ................... G06F 8/427 |
| 2006/0143594 | A1 | 6/2006 | Grimaldi |
| 2015/0082276 | A1 | 3/2015 | Balachandran |
| 2017/0255544 | A1 | 9/2017 | Plate et al. |
| 2018/0157844 | A1 | 6/2018 | Duer et al. |
| 2020/0034265 | A1* | 1/2020 | Ghaleb ................... G06F 8/427 |
| 2020/0167257 | A1* | 5/2020 | Ghaleb .................... G06F 8/74 |
| 2020/0210306 | A1* | 7/2020 | Ghaleb ................. G06F 11/323 |

OTHER PUBLICATIONS

Haoqing Zhang, "An Approach for Extracting UML Diagram from Object-Oriented Program Based on J2X" International Forum on Mechanical, Control and Automation (IFMCA 2016), Advances in Engineering Research, vol. 113, 2017, pp. 266-276.
Markus von Detton, et al., "Reclipse—A Reverse Engineering Tool Suite", Technical Report TR-RI-10-312, ACM/IEEE 32nd International Conference on Software Engineering, May 2010, 11 pages.
E. Korshunova, et al., "CPP2XMI: Reverse Engineering of UML Class, Sequence, and Activity Diagrams from C++ Source Code" Proceedings of the 13$^{th}$ Working Conference on Reverse Engineering (WCRE), 2006, 2 pages.
Matthias Rohr, et al., "KIEKER: Continuous Monitoring and on Demand Visualization of Java Software Behavior" Proceedings of the IASTED International Conference, Software Engineering, Feb. 12-14, 2008, pp. 80-85.
Tarja Systa, et al. "Shimba—an environment for reverse engineering Java software systems", Software—Practice and Experience, vol. 31, 2001, pp. 371-394.
Ralf Kollmann, et al., "Capturing Dynamic Program Behaviour with UML Collaboration Diagrams", Proceedings Fifth European Conference on Software Maintenance and Reengineering, Mar. 2001, pp. 58-67.
Paolo Tonella, et al.,"Reverse Engineering of the Interaction Diagrams from C++ Code", Proceedings of the International Conference on Software Maintenance (ICSM), 2003, 10 pages.
Chris Alvin, et al., "*StaticGen*: Static Generation of UML Sequence Diagrams", FASE, LNCS 10202, 2017, pp. 173-190.
Rainer Oechsle, et al., "JavaVIS: Automatic Program Visualization with Object and Sequence Diagrams Using the Java Debug Interface (JDI)", Software Visualization, LNCS 2269, 2002, pp. 176-190.
Lionel C. Briand, et al., "Toward the Reverse Engineering of UML Sequence Diagrams for Distributed Java Software", IEEE Transactions on Software Engineering, vol. 32, No. 9, Sep. 2006, pp. 642-663.
Koji Taniguchi, et al., "Extracting Sequence Diagram from Execution Trace of Java Program", Proceedings of the 2005 Eigth International Workshop on Principles of Software Evolution (IWPSE), 2005, 4 pages.
Takashi Ishio, et al., "AMIDA: a Sequence Diagram Extraction Toolkit Supporting Automatic Phase Detection", ICSE, May 10-18, 2008, pp. 969-970.
Hassen Grati, et al., "Extracting Sequence Diagrams from Execution Traces using Interactive Visualization", 17$^{th}$ Working Conference on Reverse Engineering, 2010, pp. 87-96.

\* cited by examiner

METHOD INCLUDING COLLECTING AND QUERYING SOURCE CODE TO REVERSE ENGINEER SOFTWARE

CROSS-REFERENCE TO RELATED APPLICATIONS

The present application is a Continuation of Ser. No. 16/045,090, now U.S. Pat. No. 10,552,286, having a filing date of Jul. 25, 2018, which is incorporated herein by reference in its entirety.

BACKGROUND OF THE INVENTION

Field of the Invention

The pending application relates to, for example, a reverse engineering method, system and a computer program thereof.

Description of Related Art

Reverse engineering (RE) of software artifacts is a process used, for example, when documentation of the software artifacts is not sufficient. The reasons for this may be that manual recovery operations of a software structure and behavior are exhaustive, time-consuming, and error-prone. Therefore, RE techniques have been introduced in order to simplify analysis of software components and extract them in a manageable format.

Conventional techniques used to reverse engineer software systems lack flexibility and comprehensiveness relying mainly on specific techniques to achieve specific goals. As a consequence the output generated by a particular technique cannot be reused for other purposes. Conventional techniques used also do not recover all information about the systems undergoing reverse engineering but instead focus on particular components which may neglect important artifacts.

Accordingly, it is one object of the present disclosure to provide a method, system and computer product for reverse engineering software that identifies and characterizes critical functionality without loss of detail or excessive exclusivity.

SUMMARY OF THE INVENTION

It should be noted that this summary merely includes examples, and the scope of the present invention is not to be limited by the following disclosure.

One aspect may be a computer-implemented method including: collecting, by a processor of a computer, analysis information from a source code of a computer program; tracing, by the processor of the computer, program behavior starting with a main entry point to produce trace data; and visualizing, by the processor of the computer, the trace data as a sequence diagram, wherein the trace data comprises a representation corresponding to a sequence diagram.

DETAILED DESCRIPTION OF THE INVENTION

Figure 1:
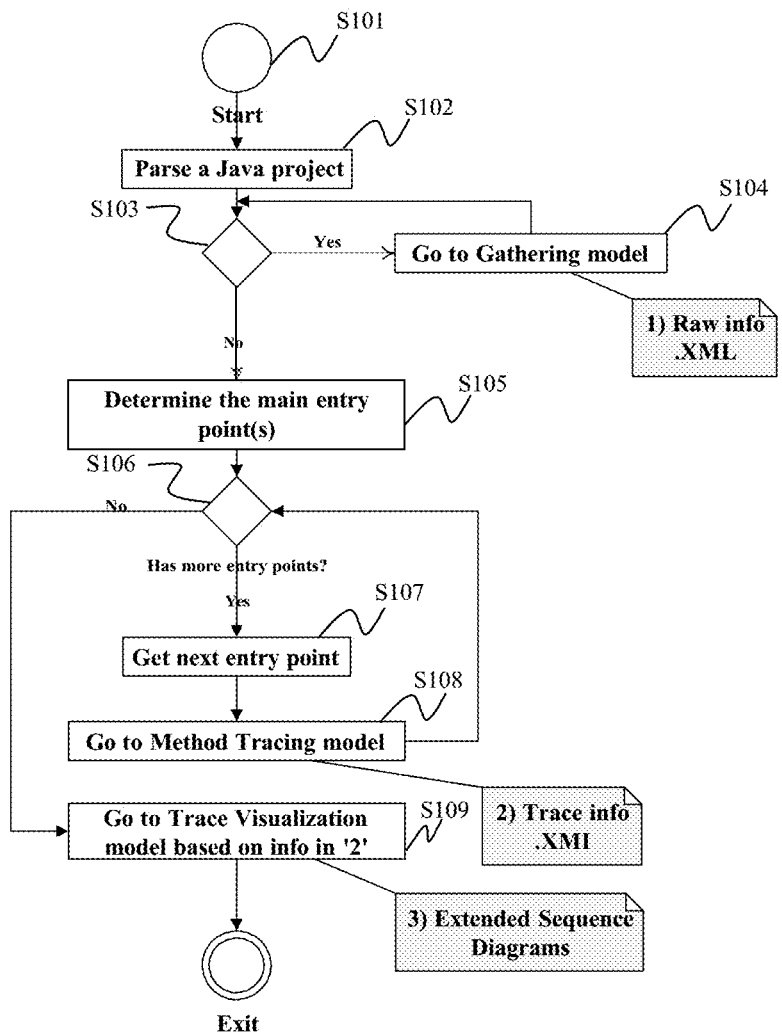
FIG. 1 is an overview flow chart showing an entire process model of one embodiment.

Techniques for analyzing and reverse-engineering software systems can utilize various approaches for identifying software components. An overall process of such a software system has a set of operations, including steps of parsing computer programs and tracing relations between different components of the computer programs. Some techniques focus on a deducing operation on a software structure, and other techniques concern mainly the behavior of the computer programs. It can be challenging to recover the behavior of the computer programs because there are interactions that can be captured only at runtime. Hence, such techniques can be classified as static or dynamic techniques, and there are techniques which are a combination of static and dynamic techniques.

Regarding reverse engineering techniques (related to software behavior) for Java source code, there is a possibility that a large amount of information related to the computer programs will be omitted and not retrieved. However, if such information is omitted from the final output, either textual or visual, it cannot represent actual software behavior. There are restricted tools created for certain purposes, and when such restricted tools are used for reverse engineering, information related to the computer programs can be omitted.

It may be preferable for users to recover as much useful and precise information of the computer programs as possible, in particular, information regarding software behavior. It may be preferable for users to generate the manageable and reusable output of an actual structure and control-flow of the computer programs which can be utilized by various application programs. In the following disclosure, one embodiment includes an extension of a compiler, for example, "Polyglot", and the output generated by this extension can be used for tracing interactions within the computer programs by, for example, using queries. Furthermore, these interactions can be graphically and automatically visualized. Here, "visualize" means not only to imagine an image of something in one's head, but also create a visual representation of something using a computer or device. Introducing a technique as an extension to a compiler may facilitate its usage, application, and future extension.

Hereinafter, an extensive background of a software reverse engineering technique with different approaches used to support it, detailed process models of an embodiment, and how they are integrated with each other are explained. After this, a prototype implementation of the embodiment including all three dependent sub-models/functions is explained. In addition, possible usages of the embodiment and its potential applications are explained.

In general, reverse engineering techniques facilitate recovering operations of system structure and behavior of computer programs. Reverse engineering techniques conduct operations through sets of processes. For example, a first step includes an operation of statically or dynamically analyzing a computer program (based on a source code or bytecode) to collect information about the computer program (see Briand L C. The experimental paradigm in reverse engineering: Role, challenges, and limitations. WCRE'06. 13th Working Conference on Reverse Engineering, 2006, IEEE, 2006; 3-8, incorporated herein by reference in its entirety). After this, the collected information is transformed into a higher level and/or more abstract representation or model. This representation can be used, for example, to compare conformance of an actual system to specifications included in analysis and design documents. An abstraction process may require human decisions (e.g. it may not be necessary to derive all information about a computer system), and this may minimize the amount of less important information (fee Merdes M, Dorsch D., Experiences with the development of a reverse engineering tool for UML sequence diagrams: a case study in modern Java development, *Proceedings of the 4th international symposium on Principles and practice of programming in Java*, A C M, 2006; 125-134, incorporated herein by reference in its entirety).

In general, reverse engineering techniques rely on heuristics, and thus, there is a possibility that visualization models are not correct. In addition, a refining process of a resultant model may require user participation (see Lanza M, Ducasse S., Polymetric views-a lightweight visual approach to reverse engineering, *IEEE Transactions on Software Engineering* 2003; 29(9):782-795, incorporated herein by reference in its entirety). In addition, there are different trade-offs between characteristics of reverse engineering technologies, especially when it comes to performance, usability, and scalability. For example, producing complete models can provide the users with a comprehensive overview of system objects and interactions. However, it requires higher memory usage, and due to this, it may not be preferable for users. If there are many infeasible paths throughout the interprocedural flow of control, reverse engineering techniques may not be applicable to large and complex systems (see Rohr M, van Hoorn A, Matevska J, Sommer N, Stoever L, Giesecke S, Hasselbring W. Kieker: Continuous monitoring and on demand visualization of Java software behavior, *Proceedings of the LASTED International Conference on Software Engineering*, ACTA Press, 2008, incorporated herein by reference in its entirety).

In order to conduct a reverse engineering operation on a software system, statically or dynamically analyzation of the software system may be performed. The static analysis may require availability of a source code while dynamic analysis may not need the source code to be available. Static analysis techniques are typically based on the source code of a computer software. However, these techniques may differ in the way they manipulate the different program components. The dynamic analysis requires the software system to be executed on a computer in order to capture its artifacts. In some cases, the dynamic techniques may require the source code be available in order to inject special scripts for capturing program information during runtime (i.e., instrumentation). Furthermore, there are also other kinds of (hybrid) techniques which are combinations of both analyses in order to acquire more accurate representations.

The static analysis is a software exploration process that parses a whole source code (or parts) of a computer program to derive both a structure and behavior of the software system including all interactions (i.e., method calls) between objects. The static analysis can be accomplished without executing a target computer program (see Grass J. E., Object-oriented design archaeology with CIA++, *Computing Systems* 1992; 5(1):5-67, incorporated herein by reference in its entirety). It conducts analysis operations by parsing program source files and logging all interactions between internal system components. Starting from a main entry point of the computer program (e.g., main method), an analyzer keeps tracking all object construction operations and method invocations between them while taking into account all constructs that control the operation flow. For each particular interaction conducted inside a computer software, information obtained through analysis is logged into a memory as interaction traces which can be used by a visualization process at a later stage.

The dynamic analysis of software systems is concerned with an operation of investigating their behavior at runtime (see Ball T., The concept of dynamic analysis, *Software Engineering*—ESEC/FSE'99, Springer, 1999; 216-234, incorporated herein by reference in its entirety). The dynamic analysis conducts operations with/without a source code. If the source code is available, it may be possible to inject tracing code-snippets into computer programs and capture all interactions issued at runtime. This can be done by logging all required information of method calls along with their callers and callees. On the other hand, several dynamic analysis-based techniques do not require a source code to be available. Instead of the source code, such techniques depend on (customized) debuggers that can supply necessary information regarding program behavior (see Systá T, Koskimies K, Müller H., Shimba—an environment for reverse engineering Java software systems, *Software: Practice and Experience* 2001; 31(4):371-394, incorporated herein by reference in its entirety).

In general, several techniques have been developed to achieve two types of analysis together (i.e., static and dynamic analysis). These techniques are called hybrids and may be more effective and efficient because analysis results produced by one of two analysis types can be complemented by analysis results of the other type (see Labiche Y, Kolbah B, Mehrfard H., Combining Static and Dynamic Analyses to Reverse-Engineer Scenario Diagrams, *29th IEEE International Conference on Software Maintenance (ICSM)*, 2013, IEEE, 2013; 130-139; and Lamprier S, Baskiotis N, Ziadi T, Hillah L M. CARE: a platform for reliable Comparison and Analysis of Reverse-Engineering techniques, *18th International Conference on Engineering of Complex Computer*

Systems (ICECCS), 2013, IEEE, 2013; 252-255, each incorporated herein by reference in their entirety). Such hybrid techniques utilize advantages of both kinds of analysis while shrinking their disadvantages.

In general, it may be preferable for many techniques supporting reverse engineering functions applied to software systems to have flexibility and comprehensiveness. Regarding flexibility, these techniques have been introduced to achieve their own specific goals. Therefore, the output generated by these techniques cannot be reused for other purposes, and thus, users need to search for other techniques. With respect to comprehensiveness, these techniques recover limited information regarding target software systems to be reverse-engineered. Such techniques focus on particular components of the software systems and this causes important artifacts to be neglected or hidden.

On the other hand, there are extensible or extension-oriented compilers which have the ability to parse computer programs and capture all information regarding the computer programs without missing any portions of important information. Furthermore, as they are extensible, users can also extend and configure them in accordance with their needs such that particular information can be retrieved. These compilers have been introduced to guarantee construction of compilers as language extensions with less cost. In addition to quality, performance and reliability, a language extension can also introduce several features, for example, optimization, increased programming level, learning, security and expressiveness. It may be possible to expect that these extensible compilers can increase a programmer's productivity.

Polyglot is an open-source compiler framework for Java that enables developers to extend this Java compiler without modifying the base compiler (i.e., in a modular manner). In addition, it facilitates source code analysis, debugging, and constructing new domain-specific programming languages (see Nystrom N, Clarkson M R, Myers A C. Polyglot: An extensible compiler framework for Java. *Compiler Construction, Springer,* 2003; 138-152, incorporated herein by reference in its entirety). Polyglot has the capability of parsing Java source programs and generating an abstract syntax tree (AST) by utilizing a visitor design pattern. The visitor design pattern facilitates capturing program nodes and their child nodes, along with ability to revisit newly created nodes. This mechanism is duly adapted to accomplish static program analysis for the sake of the reverse engineering of program artifacts. Information regarding class/method/variable declaration, object construction and method calls, as well as a flow of control in Java programs are gathered and logged.

Nevertheless, Java constructs are abstracted in Polyglot, and this causes anonymous visiting of child nodes. This means that, in some cases, a visitor which is a portion of a reverse engineering software cannot expose which calls relate to which sub-nodes. For example, if the visitor finds an if-node, it visits its child nodes in sequence, including condition, consequent, and alternative nodes. However, it cannot identify what interactions are executed in each child node. Therefore, it is necessary to properly extend Polyglot to allow gathering as much useful information about the computer programs as possible.

There are several other extensible compilers for Java. Some of these compilers are used for conducting program analysis tasks in a similar manner as Polyglot. There are extending methodologies applied to each of these compilers. For example, "JTS" and "Open Java" which are a portion of these compilers that allow restricted extensions to the language syntax and semantics (see Batory D, Lofaso B, Smaragdakis Y. Jts: Tools for implementing domain-specific languages, *Fifth International Conference on Software Reuse,* 1998; 143-153; and Tatsubori M, Chiba S, Killijian M O, Itano K. Openjava: A class-based macro system for java, *Workshop on Reflection and Software Engineering,* Springer, 1999; 117-133, each incorporated herein by reference in their entirety). On the other hand, for example, "SUIF", "Extensible Visitors" and "JastAdd" can be candidates for extending Java. However, these candidates do not support scalable and mixin extensibility (see Wilson R P, French R S, Wilson C S, Amarasinghe S P, Anderson J M, Tjiang S W, Liao S W, Tseng C W, Hall M W, Lam M S, et al. Suif: An infrastructure for research on parallelizing and optimizing compilers, *ACM Sigplan Notices* 1994; 29(12): 31-37; Krishnamurthi S, Felleisen M, Friedman D. P., Synthesizing object-oriented and functional design to promote re-use, *European Conference on Object-Oriented Programming,* Springer, 1998; 91-113; and Ekman T, Hedin G, The jastadd extensible java compiler, *ACM Sigplan Notices* 2007; 42(10):1-18, each incorporated herein by reference in their entirety). This means that they may need to prepare a duplicated program source code for specific extending scenarios. For instance, "JastAdd" may need to prepare a duplicated program source code inside each pass in the case of inserting a new node. Regarding "Extensible Visitors", a method may necessarily be added to all existing node types if a new pass is added. In order to employ scalable and mixin extensibility, Polyglot requires no code duplication for any change that affects many classes.

The "abc extensible compiler" is a candidate because it is built on the top of Polyglot and supports aspect-oriented programming constructs (see Avgustinov P, Christensen A S, Hendren L, Kuzins S, Lhoták J, Lhoták O, de Moor O, Sereni D, Sittampalam Tibble J. abc: An extensible AspectJ compiler, *Transactions on Aspect-Oriented Software Development I,* Springer, 2006; 293-334, incorporated herein by reference in its entirety). However, it is only compatible with the first version of Polyglot, and thus, new features added to Polyglot version 2 (e.g., parsing Javadoc comments) are not available.

Hereinafter, one embodiment of the present disclosure is explained. In order to obtain a sequence diagram from a given Java software system by conducting a reverse engineering operation, a sequence of consecutive processes/steps is to be accomplished. Each of these processes supplies its output as an input to a following process. This supports feeding each process with required information to enable integration of an entire process. An entire process model is shown in FIG. 1 (S101), where a Java software system is analyzed statically. Using the information collected from the static analysis (S102 is a parsing step of a Java project, and information of the source code is gathered at S104 for all Java source code files while repeating this operation via a branch at S103 and to query for more java files)), the expected system behavior is traced (S108) starting from a main entry point in the Java software system (detected at S105), and ending with a trace file (Trace info.XML) that contains the representation of a corresponding SD (sequence diagram) (S106 to S109). If there are multiple entry points, the operation is repeated (S106). Eventually, this file (Trace info.XML) is visualized using the proper SD elements (they can include standard elements and extended elements explained later) (S109).

Figure 2:
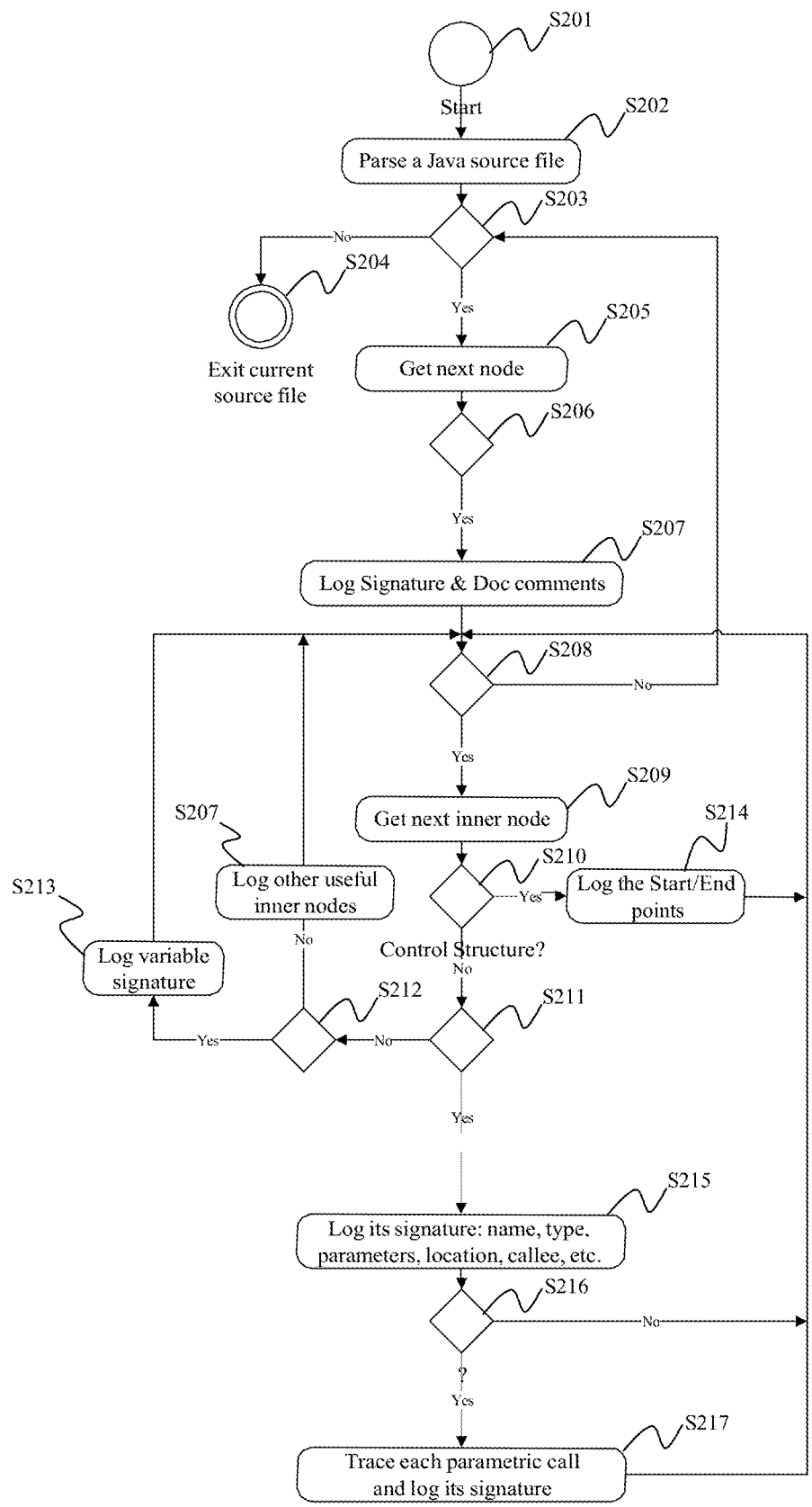
FIG. 2 is a flow chart showing an operation or model of extracting program information in one embodiment.

Once a user specifies a target software project to be reverse engineered, a process/step of information collection shown in FIG. 2 (S201) starts to gather all required information from the source code of the given software project (S202). Branch S203 will query whether more nodes are present and get additional nodes if present (S205). If the project consists of several source files, each file will be parsed to get the AST (abstract syntax tree) within the files, and then each node of that AST can be visited individually. Branch S206 will query whether a class, interface, method or constructor Declaration is present and log results (S207).

A parser, which is a portion of the software of this embodiment, may visit all nodes included in the software project. When the parser comes across a declaration node (for example, class, interface, method, or constructor declaration), the parser may log its signature and then check whether or not the declaration node contains inner nodes inside its block. If there are one or more inner nodes (S208), the parser keeps collecting the inner nodes one-by-one, and proceeds with a proper action based on the type of each node (S208 to S217) including control structure (S210), method/constructor call (S211), whether declarations are available (S212), and/or whether there are calls in the parameter (S216). At S210, it is detected whether or not the node includes a control structure. At S214, start/end of a detected control structure is logged. When the node includes a method or constructor (S211), a signature, a name, type parameters location callee and/or other information may be logged (S215). If the node includes a declaration (S212), a variable signature is logged (S213). It is acceptable to modify the operation of FIG. 2 so as to log other information, for example, at S207 or other steps. Whatever the type of the node is, its signature and position can be logged (i.e., file name and line number where it is located). Then, other information regarding that particular node may be investigated, including its child nodes (S208).

With respect to control structure nodes (i.e., "for", "while", "do-while", "if", "switch", (? :) operator, "try-catch" clause), the first reaction of the visitor is to record their start and end positions. After that, their child nodes are visited, including the block of inner statements (i.e., the body), if any, and a different action is applied to each inner statement based on its type. Each control structure can have different child nodes. Table I shows various control structure nodes with their possible child nodes. With respect to the body of such nodes, it can either be a block of statements or a single statement. Some control structures can have either option. For example, "for statement" can be "Single statement" or "Block" of statements and have child nodes of "Initializer", "Condition" and "Increment", and "try-catch" clause" can be "Block" of statements and have child nodes of "Try", "Catch" and "Finally".

TABLE I

Types of control structure nodes and their child nodes

| Control structure node | Child nodes | Block or Single statement | |
| --- | --- | --- | --- |
| for statement | Initializer \| Condition \| Increment | X | X |
| while statement | Condition | X | X |
| do . . . while statement | Condition | X | |
| if statement | Condition \| Consequence \| Alternative | X | X |
| switch statement | Condition \| Case \| Default | X | |
| (? :) operator | Condition \| Consequence \| Alternative | | X |
| try - catch clause | Try \| Catch \| Finally | X | |

In some cases, method call nodes can be considered one of the most important portions of the code because they may represent actual interactions between objects and classes of a project. This interaction can either be achieved locally, internally or externally. Local interactions refer to the communication of system components with each other. Internal interactions denote links created between system objects and classes with ones of other same-language projects or ones provided by the programming language. External interactions are represented by invocations of operating system libraries, remote methods, or even methods that try to read/write, for example, a memory, file system, command prompt, GUI (graphical user interface) or network sockets. For each kind of these calls (interactions), the visitor examines whether the method call involves other calls (interactions) inside its parameters or not (i.e., nested calls). If yes, it registers their signatures and types and then continues to a next node in the parent block.

Variable declarations and assignments can be also considered important portions. Their importance may be expressed by their occurrence in method calls. In other words, it is common to have variables in control structures and method calls. Variables can be used in the conditions, in method call parameters, or as a recipient for values returned by method calls. Therefore, having the variable information in the final output may assist a user in understanding an overall meaning, purpose and/or function of various elements.

The information collection process/step continues operations of gathering program nodes and transcribing their signatures in a temporary storage file. Once the visitor finds no more nodes in a certain project, the visitor wraps up the log file to be utilized by a tracer which is a portion of software functions provided by this embodiment in an immediate subsequent step.

Figure 3:
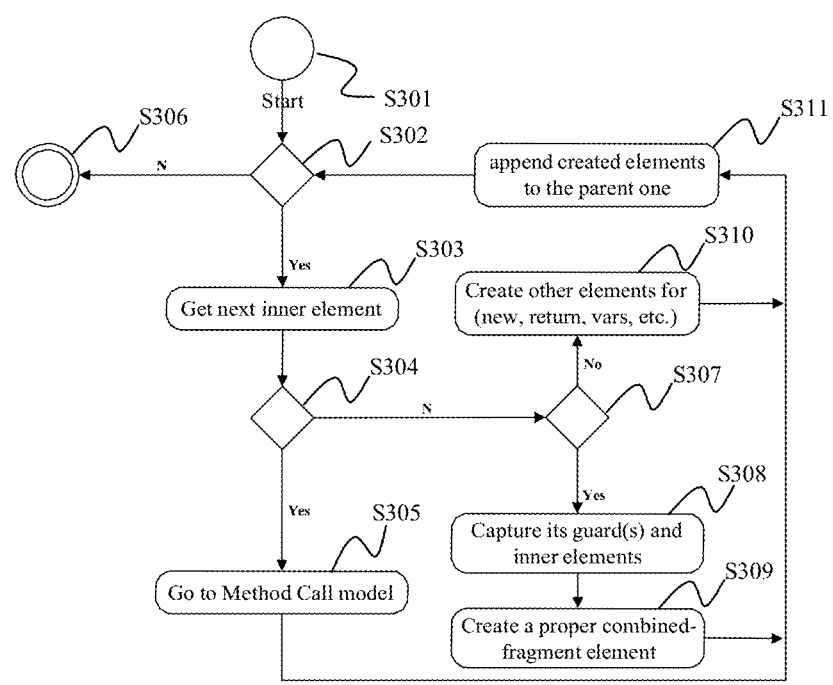
FIG. 3 is a flow chart showing an operation or model of tracing interactions of a computer program described in one embodiment.

The information gathered by the visitor can be used to feed the tracer following the visitor, which captures actual behavior and series of interactions of the target program. Once the tracer acquires the collected program information in a manner as shown in FIG. 3, it begins to trace method calls executed in the program (S301).

It is not necessary to have the main method appear at the onset of the program. This implies that the tracing process or tracer will not read the collected information in sequence. Instead, it may initiate the tracing process by looking for a main entry point in the program.

In some cases, a computer program may have multiple scenarios represented by having multiple main methods. The tracer may identify all entry points (i.e., main methods) of the program and produce the corresponding sequence diagrams based on the selected ones. The user may be notified of the multiplicity of main methods in the program (if any), and the user can decide whether to trace all different scenarios of the program or choose specific scenarios based on preference.

At S302, the tracer detects whether or not there are more inner elements. If the element is a method call (S304), the method call is analyzed (S305). If the element is a control element (S307), information is obtained (S308 and S309). After appending the obtained/created elements to a parent element, the operation is repeated (S302) if necessary. The absence of inner elements can lead to the exit from the method (S306).

This embodiment may have another feature in which the tracer is able to trace method calls even if the computer program cannot be executed due to the presence of certain types of errors. For instance, if the program has an invocation on a method which is not defined or is an out-of-scope method (here, this is a method m1), the compiler will produce an error message, for example, "error: cannot find symbol m1( )". However, in this embodiment, a collector which is a portion of functions of this embodiment gathers program information and, subsequently, the tracer traces method calls and visually notifies a user of the errors.

As shown in FIG. 3, each element included in each method of the target computer program to be analyzed is taken and logged into an XMI representation of SD. Whenever a control structure element is found (S307), the tracer logs a fragment element with a proper signature (S309) and registers the start and end of the control block and a guard and inner element are also captured (S308). Other elements that do not require processing are directly logged with their suitable element types.

Figure 4:
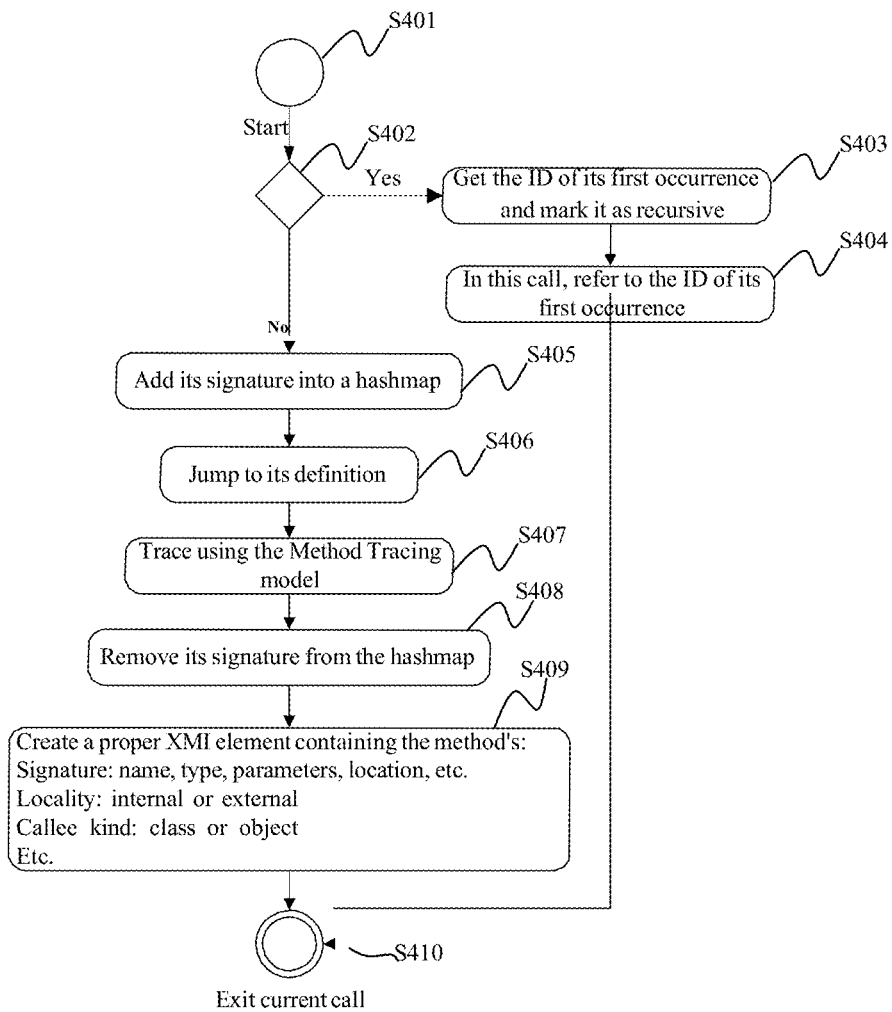
FIG. 4 is a flowchart showing a tracing operation on one example of a method call.

Whenever a method call element appears in the source code of the computer program, it may be necessary to determine availability of the called method and its object to locate them in raw program information. Branch (S402) determines whether a call element already exists in the hashmap. After locating the anticipated method definition, the tracer jumps to the called method (S406) and starts processing a method call model (S407) shown in FIG. 4. In this model of a calling process, the tracer pushes a method signature into a stack to allow identification of recursive calls (S405). Before pushing, once the tracer finds out that the called method's signature already exists in the stack (S402), then that method is marked as recursive (S403), and existing information of the called method is referred (S404). After this, the tracer repeats the same process done in the main method until it reaches the end of the method body. At that stage, the method signature is popped from the stack (S408) and logged with its proper tag (S409) and may subsequently exit the call (S410).

Figure 5:
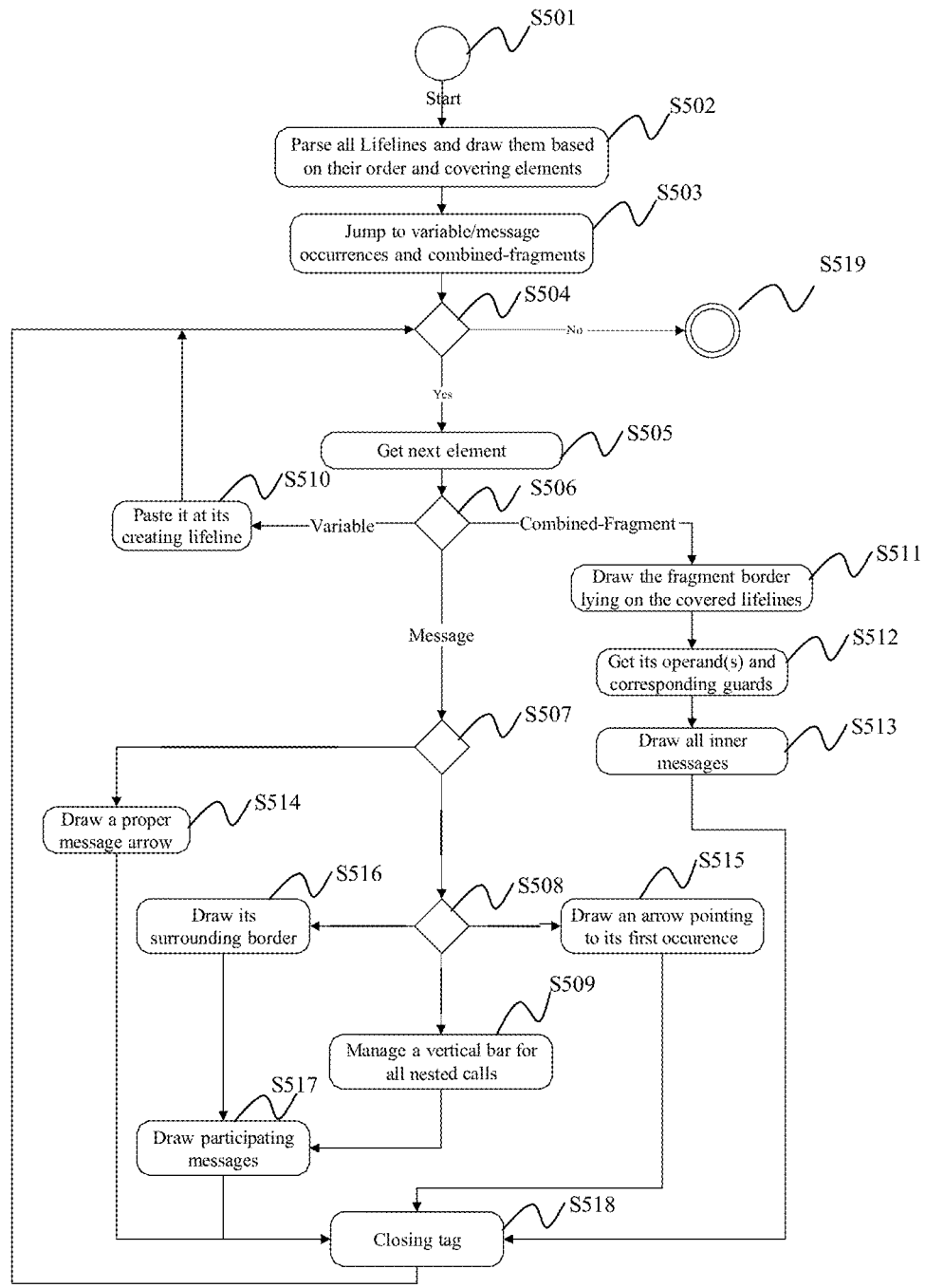
FIG. 5 is a flowchart showing a visualizing process or model of one embodiment.

FIG. 5 shows a visualizing model/process of this embodiment. In this model, all elements generated by the tracer can be visualized using their appropriate visual elements (i.e., notations). This process starts with looking at a trace file generated by the previous process (i.e., program interactions tracer) (S501). If the program contains static initializations, then all interactions to be executed in the initialization will be originated from a special kind of lifeline that is specifically used for such kinds of interactions. If not, the main method may be considered to be a starting point of the target computer program to be analyzed. In the case that there exist two or more different main methods distributed in different classes, then the target computer program can be considered to have two or more entry points. Thus, a visualizer which is a portion of functions of this embodiment may take each entry point as an independent scenario and produce different diagrams representing different scenarios.

Each tag in the trace file has its own attributes. Therefore, the visualizer fetches all important information regarding each element from its attributes, sub-elements, and/or other elements that are referred to by this particular element.

In FIG. 5, at S502, all lifelines are parsed and are drawn in accordance with their order and covering elements. A visualizer jumps to the first element (variable/message occurrence and/or combined-fragments) (S503) and continues its operation on all elements (S504) and branches to S505 if more elements are present or provides a final visualization (S519). When a next element is a combined-fragment, the visualizer draws a fragment border lying on covered lifelines, gets operands of the combined fragment and corresponding guards, and draws all inner messages (S511 to S513). After this, a closing tag is generated (S518). When the next element is a message (S506), and if the message is simple (S507), the visualizer draws a proper message arrow (S514). If the message is complex and recursive, the visualizer draws an arrow pointing to the first occurrence of the message S508. If the message is complex and nested, the visualizer applies a vertical bar for managing all nested calls and draws participating messages (S509 and S517). If the message is complex and compound, the visualizer draws its surrounding border and draws participating messages (S516 and S517).

Hereinafter, a implementation of this embodiment is described. The description shown below includes the environment used as an infrastructure of this implementation, programming languages, and frameworks.

In this implementation, Java programming language was used as a target language on which the above-described extensions were built. Java was selected due to its popularity and availability of various open-source extensible compilers as well as open-source projects. In addition, various related work, in generally accessible literature, has used Java in its implementation, and thus, a Java implementation allows a fair comparison between such related work and this implementation. Other programming languages include JVM languages such as Clojure, a functional Lisp dialect, Groovy, a dynamic programming and scripting language, JRuby, an implementation of Ruby, Jython, an implementation of Python, Kotlin, a statically-typed language from JetBrains, and Scala, a statically-typed object-oriented and functional programming language.

Any version of Java grammar can be used by Polyglot including 1.4, 1.5, 1.6, and 1.7). Other versions of Java grammar can be extended to Polyglot so that it may be possible for developers to use a version they prefer while making extensions. This implementation supports the default grammar used by Polyglot (i.e., version 1.4), and linking it with other versions would not be a problem. Extending a base compiler that is linked to older versions of grammar may guarantee compatibility with recent versions of the grammar. In other words, extending the compiler based on newer versions of grammar may not provide compatibility with older releases of Java grammar. However, this is not a limitation on the embodiment disclosed in this document.

Polyglot is an open-source compiler framework for Java that enables developers to extend the Java compiler in a modular way (i.e., without touching the base compiler). In addition, it facilitates source code analysis, debugging, and construction of new domain-specific programming languages.

Polyglot is capable of parsing Java source programs and generating an Abstract Syntax Tree (AST) by utilizing a Visitor design pattern (see Vlissides J, Helm R, Johnson R, Gamma E., *Design patterns: Elements of reusable object-oriented software*, Reading: Addison-Wesley, 1995, incorporated herein by reference in its entirety). The Visitor design pattern allows easy capture of nodes and their children, along with the ability to revisit newly created nodes. This mechanism may duly be adapted to accomplish a static program analysis for the sake of reverse engineering program interactions. Information on class declarations, object creations, methods calls, as well as a control flow of computer programs may easily be captured and logged in appropriate formats, which can be used for tracing all call sequences in order to construct sequence diagrams that reflect the corresponding Java program.

Nevertheless, some Java constructs are abstracted in Polyglot, which may cause anonymous visiting of child nodes. This means that, in some cases, there may be difficulty distinguishing which calls relate to which sub-nodes. For example, if there is an if-node, it may be possible to visit its child nodes in sequence, including condition, consequent, and alternative nodes. However, it may not be clear what interactions are executed in each child node. Therefore, it may be preferable to properly extend Polyglot to allow gathering as much useful information of the target computer programs as possible.

Polyglot was not capable of capturing the Javadoc comments (or any other comments) because they are basically ignored by the parser that Polyglot is based on. Therefore, this implementation modifies Polyglot and its parser's rules so as to enable them to accomplish such activity. There is a possibility that later versions of Polyglot may have these or similar functions.

In Polyglot, some of the AST, for example, child nodes can be anonymous. This means that information regarding where exactly they are executed is not collected. For example, "If" and "Conditional" nodes represent if statements and "? :" conditional operators, respectively. Each one of these nodes contains three child nodes: "Condition", "Then", and "Else" parts. In an "If" node, "Then" and "Else" parts are statement nodes of the type "Stmt" node, while in the "Conditional" node, they are expression nodes of the type "Expr" node. In both "If" and "Conditional" nodes, the "Condition" part is of the type "Expr".

When the Polyglot's visitor-pass visits these child nodes, a NodeVisitor which is a portion of functions of Polyglot cannot determine what gets executed in each part. For instance, if the "if" statement has a method call in the "Condition", one in the "Then" part, and another one in the "Else" part, then a NodeVisitor-based information gatherer captures them as three consecutive "Call" child nodes in the "If" node. As mentioned above, this is because those "Condition", "Then", and "Else" parts are not marked in the AST tree.

Therefore, there may be different approaches to properly extend Polyglot. In one approach, there may be an issue in configuring the type system, while another may require modification of a base compiler. Here, two approaches are explained regarding an implementation for extending Polyglot.

In the first approach, "Stmt" and "Expr" nodes (represented as interfaces) were extended to have a marker variable that determines whether a statement or expression is accessed in a "Condition", "Then", or "Else" part. This marker is defined as an integer variable assigned to one of the values shown in Table II. Each newly created statement was initially assigned a value of "NONE". This approach is helpful to mark the statements and expressions of the nodes that are composite of child nodes.

TABLE II

Flags used to mark 'Stmt' nodes

| Flag | Value | Anticipated Parent |
|---|---|---|
| NONE | 0 | All |
| COND | 1 | If, For, While, Do, |
| THEN | 2 | If, Conditional |
| ELSE | 3 | If, Conditional |
| INIT | 4 | For |
| ITER | 5 | For |
| TRY CLAUSE | 5 | Try |
| CATCH BLOCK( | 6 | Try |
| FINALLY BLOC | 7 | Try |

In order to thoroughly achieve this kind of marking for statements and expressions of the "If", "For", "Conditional", and other pre-listed nodes, their constructors have also been extended to manage initialization of these expressions and statements with the appropriate marker values. This allows the information collector to identify where other blocks of statements and expressions are accessed throughout the source code.

The above-described approach may have a problem in that it may require modification of the base Polyglot compiler. In this second approach, the base compiler is not affected since everything is embedded within the extension. In this approach, each of the nodes that may be composed of certain blocks of statements is extended in a Node Factory which is a portion of Polyglot's functions modified in this implementation. In other words, the extended Node Factory has an extension of each node, named "Ext_"+<NodeName>, where child nodes are accessed in a systematic way. For example, an "If" node is represented by an "If" interface and "If_c" class in the base compiler. Therefore, "IF" is extended and given the interface name "Ext_If" and class name "Ext_If_c"; where "Ext_If" extends "If", and "Ext_If_c" extends "If_c" and implements "Ext_If". In addition, a constructor of "Ext_If_c" invokes its super constructor and supplies the super constructor with necessary parameters.

A "visitChildren" method is a routine for visiting child nodes of any composite statement. This means that an operation of visiting child nodes can be controlled through this method.

Polyglot's compiler visits child nodes of a statement in a sequence manner taking into account a left-associative principle of Java by default. Regarding each of the extended nodes, this implementation has functions which are overridden on methods to allow injecting child-node identification code before visiting every child node. For example, in the "Ext_If_c" node, visits of child nodes are identified in the manner shown below:

```
@Override
public Node visitChildren(NodeVisitor v) {
// Notifying the InfoGatherer pass
// initialization statement(s) is visited here
List<ForInit> inits = visitList(this.inits, v);
// initialization statement(s) is terminated here
// condition expression is visited here
Expr cond = visitChild(this.cond, v);
// condition expression is terminated here
// iteration statement(s) is visited here
List<ForUpdate> iters = visitList(this.iters, v);
// iteration statement(s) is terminated here
// body is visited here
Stmt body = visitChild(this.body, v);
// body is terminated here
return reconstruct(this, inits, cond, iters, body);
}
```

Since the AST node factory is modified, it is necessary to modify grammar rules that are directly connected to all extended AST nodes in order to cope with changes that have been made. This includes replacing non-terminals connected to an old version of the Node Factory with proper references to its extended version.

For instance, the grammar rule that is matched by the compiler whenever a "for" statement occurs in the source code is represented by the non-terminal "for_statement". This non-terminal immediately creates a new node of "For" which is represented by the one defined in the Node Factory of the base compiler. Hence, this node construction is mutated so as to refer to an extended version of the for-statement which is represented in the extended Node Factory by a node "Ext_For".

An example is shown below in which how the grammar is adapted, the extension of the "if" node is provided, one of customized grammar rules that access this particular node is as follows:

```
------------------------------------------------------------------
drop { if_then_else_statement }
extend if_then_else_statement ::=
    IF:n LPAREN expression:a RPAREN statement_no_short_if:b
    ELSE statement:c
{: RESULT = parser.nf.ExtendedIf(parser.pos(n, c),
    a,
    b,
    c);
:}
------------------------------------------------------------------
```

Polyglot has many compiler visits that are prepared to accomplish a complete compilation that results in ".class" files. Each visit is responsible for a particular functionality that is separate from the other visits. In this implementation, in order to allow Polyglot to gather program info and log the program info into an intended format, the "NodeVisitor" visit class in Polyglot was extended with another visit class called "InfoGatherer". This compiler visit performs all reverse engineering functionality of this implementation, including a collection operation of elements and their signatures and a logging operation of these collected items in an XML, tree.

The extended visit is overridden as several methods of the "NodeVisitor" visit, for example, "begin"/"finish" and "enter"/"leave" methods. The methods "begin" and "end" are just used to open the log file for writing and to close the log file after logging all needed information, respectively. The "enter" and "leave" methods are called each time when the compiler passes enter into a new node in the AST tree and exit from that node, respectively. All necessary information regarding Java programs are collected in these two methods if the nodes belong to pre-determined types that contain information necessary to be gathered and logged. In this implementation, the visits extended in this implementation escape some of the nodes that are not important. In other words, when using Polyglot, some nodes may be nested with too many child nodes. Therefore, it is possible to have a limitation or restriction for a collector/collection operation so as to predetermine specific types of nodes to gather information that may be interested in.

Figure 6:
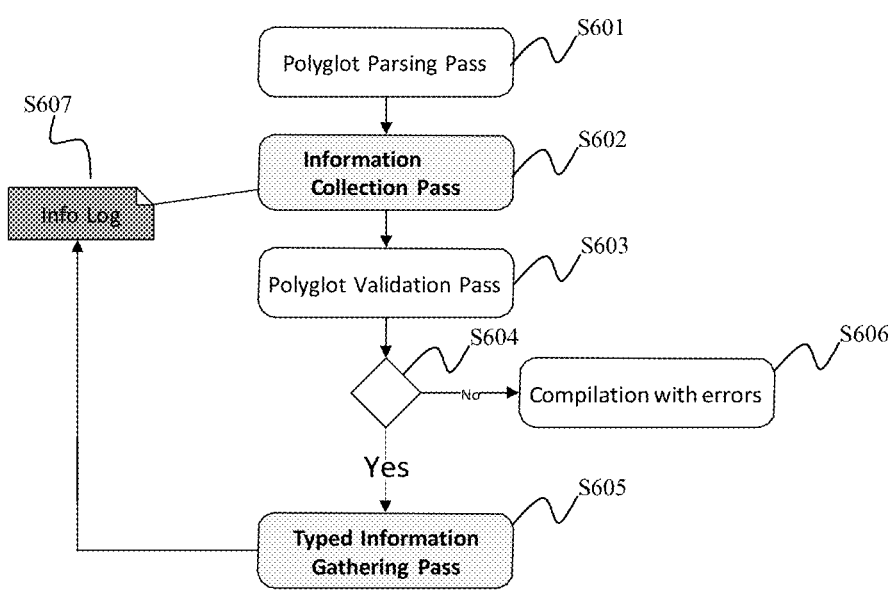
FIG. 6 is a flowchart showing functions/operations of extended Polyglot passes.

Polyglot employs a set of compiler passes that are executed one after another in order to comprehensively analyze the source code from all perspectives. In this implementation, a Polyglot scheduler (S601) was extended with two co-related passes shown as in FIG. 6 with gray-filled boxes (S602 and S605).

The first pass (S602) is placed after the Polyglot parsing pass (S601). The parsing pass (S601) is the same function as the original Polyglot which parses the overall source code. The information collection pass (S602) is responsible for gathering program information regardless of its correctness. The information collection pass (S602) stores collected information "Info Log" which can be a file. This means that all information is gathered and logged regardless of errors included in the source code. After this, Polyglot continues other passes until it reaches a validation pass (S603) which guarantees that the program is fully checked across all aspects including, for example, type checking and/or reachability checking. If the program is validated successfully (S604), then operations of the second pass (S605) are conducted which start gathering information again. However, here, they are enriched with types. S605 can replace the data stored in "Info Log". If the target computer program has compilation errors (S604), operations of the second pass (S605) are not conducted, and this means that the tracer and visualizer continue their operations using a dirty program and replaced in the Infolog (S607).

XML representation is applied for storing raw information collected from the parsed programs. Such information is generated either at runtime (i.e., through dynamic analysis) or by analyzing the source code (i.e., static analysis). This is useful since it allows specific scenarios of the target program to be traced.

The same representation (i.e., XML files) is used in this implementation. However, new XML tags, elements, and attributes are introduced in this implementation. Each XML document has a root element which is named either "<Project>" if there are semantic errors in the program or "<Typed_Project>" if the program is free of errors. All other program elements (or nodes) are stored inside this root element.

Class and interface declarations are represented using "<Class>" element with an attribute called "type" which identifies whether it is a "class" or "interface". Similarly, method and constructor declarations are represented using "<Method>" element with an option "type" which indicates whether it is a "method" or "constructor". Method and constructor calls are represented using a "<Call>" element, where an attribute is set to indicate whether a callee is defined within the program or externally. External callees contain methods which are not defined in the program itself, but from other packages, for example, language or system libraries. All elements contain the three attributes "file", "posStart", and "posEnd" to determine their exact locations (i.e., line numbers on a Java source code in which they are contained). This may help navigating the source code at any time during visualization and/or operations in this implementation.

A sample class is shown below. It is clear that this class has a Javadoc comment and contains only one method, which is composed of a variable declaration and an "if" condition. The "if" condition has two branches, one is its consequence while the other is an alternative. In the consequence, there is a call to a method "factorial" while in the alternative there is a return statement.

```
1    /**
2     This is the Main class of the program.
3     */
4    public class Simple
5    {
6        public static void main(String args[ ])
7        {
8            int i;
9            if(i > 0)
10           {
11               factorial(i);
12           }
13           else
14               return;
15       }
16   }
```

Once the above class is parsed using an information gatherer which is a portion of implemented functions, it generates its corresponding XML file that contains all the important information about that program, as shown below.

```
<?xml version="1.0" encoding="UTF-8"?>
<TypedProject>
<Class name="Simple" package-"null" type="class" modifiers="public" extends=" " implements=" " posStart="4" posEnd="16" filepath="C:\myprojects\Simple.java">
<Javadoc>
This is the Main class of the program.
</Javadoc>
<Method name="main" params="String args"type="method" paramTypes="String[ ]" modifiers="public static" returnType="void" posStart="6" posEnd="15">
<Declare name="args" type="String[ ]" posStart="6" posEnd="6"/>
<Declare name="i" type="int" posStart="8" posEnd="8"/>
<ControlFlow type="if" params="i > 0" posStart="9" posEnd="14">
<Branch type="Cond" params="i > 0"/>
<Branch type="Then" params="i > 0" posStart="10" posEnd="12">
<Call name="factorial" callee="Simple" calleeType="Simple" params="i" paramTypes="int" chained="No" nested="No" recursive="No" posStart="9" posEnd="9">
<Arg type="var" name="i" posStart="9" posEnd="9"/>
</Call>
</Branch>
<Branch type="Else" params=" " posStart="13" posEnd="14">
<Return params="fact" posStart="14" posEnd="14"/>
</Branch>
</ControlFlow>
</Method>
</Class>
</TypedProject>
```

In order to extract actual program behavior, it is necessary to trace calls in a given computer program starting from a main method. Indeed, the program may have more than one entry point where each of the entry points can generate a different scenario. A user may participate in determining the main entry point of the corresponding program in order to obtain the target program behavior to be traced.

In this implementation, a tracing technique is composed of a set of heuristics built in a Java program which employs XPath parsers and queries to access, load, and search for particular information from an XML log file generated by the above-described technique built as an extension of Polyglot. The tracer launches its operations by executing an XPath query that returns entry points of the target computer program to be traced. If only one entry point is detected, then the tracer starts tracking method calls recursively until it reaches the end of the method calls from this entry point. If there are multiple entry points in the computer program, the tracer informs the user of the existing main methods in the project. Therefore, the user may be asked to participate in the determination of whether to proceed with a particular entry point or let the tracer go through each of them independently in order to produce all possible/obtainable scenarios in the computer program. It may be possible for the tracer to accept a request to conduct operations on one or more (not all) of the main methods from the user.

While tracing, the tracer keeps or obtains notes/information of the lifelines, objects, fragments, messages, and lifelines of the corresponding scenario. These notes are stored in an XMI document that represents the resulting sequence diagram. As mentioned above, several extensions to an SD can be applied to enrich the SD with expressive information that may help improving program comprehension. XMI representation of the SD can be extended with new tags, elements, and options. These extensions are intended to be added to the XMI representation in a way that keeps it backward compatible with the standard UML SD. In other words, although the representation of SDs of this implementation uses extended XMI representation, it can be visualized using conventional tools.

In this embodiment, standard notations of UML sequence diagrams are extended using XMI tags and visual elements that are capable of carrying all the required information about the proposed extensions.

Each of the extensions in this embodiment has its own XMI representation, represented by elements and attributes. To show the extended XMI of this implementation, screenshots of sample programs to which these extensions are applied are shown below.

An XML namespace called "xmlns:xxmi" was assigned to the extension in this embodiment. This namespace is defined in the main "<uml:Model>" element that encompasses all elements of any given sequence diagram. This namespace is used as a qualifier for the elements and attributes of this implementation. For instance, static blocks are represented in the extended XMI representation using an element "<xxmi:staticBlock>". Extended attributes of standard element are given their names aligned with the 'xxmi' namespace as prefixes (e.g., for the '<message>' element, a new attribute called "xxmi:isRecursive" is introduced). The attributes of the newly extended elements are not given the prefix "xxmi:".

A unique identifier is assigned to each element in the generated XMI representation. This identifier can be used, for example, when one element refers to another element in the XMI file. Different element identifiers are used in the XMI representations with proper prefixes, and types of the elements are recognized during visualization. Types of element identifiers can include the IDs of the messages, lifelines, fragments, and other items representing additional and assisting elements as well the elements representing notations of this implementation.

The format of the automatically generated IDs can be given by the triple "<pre-fix><underscore><number>", where "<prefix>", "<underscore>", and "<number>" represent placeholders for the appropriate prefix type, "_", and a type-based unique number, respectively. For each element type, the unique number begins counting from one, in a 3-leading-zeros style. For example, the first element of the type "message" is given the id of "message_0001", while the first element of the type 'lifeline' is given the id of "lifeline_0001" in the same XMI file.

As an example, for each element described below, the following attributes may be observed.

```
xxmi:file="C:\tests\cases\Sample.java"
xxmi:posStart"13"
xxmi:posEnd="13"
```

These attributes maintain information about a location of a certain element in the source code, which assist in navigating the source code of that element. The location is represented by a file path, starting line, and ending line of any particular element.

For representing a block of calls, an approach of this implementation is explained below. It may be possible to use opening and closing tags for including a set of elements inside another enclosing one. These opening and closing tags may work in an XMI representation of this implementation. However, a problem can be detected with regard to compatibility with the standard XMI model. If the extended XMI of this implementation is parsed using other standard tools, it may not be possible to fetch interactions that are inside an enclosing element created by the methodology of this implementation. The reason behind this problem is that other tools may always ignore non-standard elements and attributes, and this means that the entire extended block (with its inner interactions) may be neglected.

Therefore, this implementation introduces another solution to make the output of this implementation compatible with other standard tools. Instead of using opening/closing tags for a certain block of interactions, opening/closing elements are used. To open a new enclosing element, an ID followed by an attribute is assigned that marks it as it is an opening tag; i.e., "xxmi:status="start"". To close this enclosing element, another value for this attribute is used that refers to the closing mark; i.e., "xxmi:status="end"". Therefore, when the extended XMI is parsed by other tools, only the opening and closing elements may be ignored, meaning that all interactions happening inside them may be readable.

For interactions accomplished during a static initialization process that may be accessed by the JVM (Java virtual machine) before accessing the main method, this implementation includes an additional lifeline in the resulting SD layout that will represent a source of all these interactions. This lifeline is colored with a special color to distinguish it from other lifelines and given the name of the format "Static@<MainClassName>", where the "<MainClassName>" represents a placeholder for the name of the main class of the computer program intended to be analyzed.

Regarding a capturing operation of the initialization process, a test case which involves a set of static classes, variables, methods, and block is used. In addition, this test case includes scattered different message-printing methods to recognize which part is executed and clarify the execution order. After the execution, it becomes possible to understand that the execution is based on their appearance in the source code.

```
<xxmi:staticBlock xmi:id="staticblock_0001"
    xxmi:status="start"
    filepath="C:\tests\cases\Sample.java"
    posStart="9" posEnd="11"
/>
<!--Sequence of Variable and Message Occurrences &
CombinedFragments-->
<xxmi:staticBlock xxmi:status="end"/>
```

All interactions executed within static blocks were placed between the opening (i.e., with xxmi:status="start") and closing (i.e., with xxmi:status="end") elements of the static block.

This extension can include a new elements called <xxmi: var>" which preserves the general information of, for example, variable declarations, including name, data type, type (i.e., local or member) and/or location, as shown below:

```
<xxmi:var xmi:id="var_0001"
    name="str"
    type="String"
    xxmi:kind="Local"
    xxmi:hasAssign="Yes"
    xxmi:file="C:\tests\cases\Sample.java"
    xxmi:posStart="13" xxmi:posEnd="13"
/>
```

Each variable-declaration element has an ID, name, and type. The attribute "xxmi:kind" differentiates local variables from variables that are declared as parameters of a given method/constructor. When a value is assigned to one variable, then "Yes" can be assigned to "xxmi:has Assign" attribute, and otherwise, "No" can be given. In addition, the location of the variable in the source code is provided as well.

Another element with a type "<fragment>" including "event" to which "defaultEventOfVarOccurrency" is assigned can be generated to reflect the occurrence of such variable declaration. This element can have its own ID along with a pointer to the ID of the intended variable declaration.

```
<fragment xmi:id="varOccur_0001"
        var="var_0001"
        event="defaultEventOfVarOccurrency"
        xmi:type="xuml:VarOccurrenceSpecification"
        xxmi:status="start"
        covered="lifeline_0001"
/>
<!--Sequence of interactions used for variable assignment-->
<fragment event="defaultEventOfVarOccurrency" var="var_0001"
    xxmi:status="end"/>
```

The variable occurrence contains opening and closing fragments. This is needed for enclosing all interactions that represent the set of method calls used for assigning a value for a variable, if any. In this case, this occurrence may cover lifelines (covered by the calls used for variable assignment) by listing their IDs in the "covered" attribute.

In order to support the differentiation between lifeline types, new attributes were added in this implementation to the classes that are always connected to lifelines in XMI representation of a SD. These classes are created using an element of a type "<packagedElement>", as shown below.

```
<packagedElement
    xmi:type="uml:Class"
    xmi:id="class_0001" name="SB"
    xxmi:locality="Local" xxmi:NonLocalType=" "
    xxmi:file="C:\tests\cases\Sample.java"
    xxmi:posStart="1" xxmi:posEnd="18"
/>
```

An attribute "xxmi:locality" denotes whether the lifeline corresponds to a locally-created class/object or utilized from language libraries (i.e., the possible values are either "Local" or "Lang"). If it is not local, the "xxmi:NonLocalType" attribute can have a value that defines the general type of this class/object.

In order to associate this class to a specific lifeline, it is necessary to refer to its ID at the corresponding lifeline. Depending on the standard XMI of SDs, each lifeline should correspond to an "<ownedAttribute>", which in turn refers to the ID of its class type, as shown below.

```
<lifeline
    xmi:type="uml:Lifeline"
    xmi:id="lifeline_0001"
    name="s:Sample"
    represents="ownedAttribute_0001" <!-- refers to ownedAttribute ID
    -->
coveredBy=" "
/>
<ownedAttribute xmi:id="ownedAttribute_0001"
    name="Sample"
    type="class_0001" <!-- refers to the ID of the class -->
/>
```

To represent nested calls, three new XMI elements are provided in this implementation: "<xxmi:nestedcallfragment>", "<xxmi:originalCall>", and "<xxmi:innerCalls>". The element "<xxmi:nestedcallfragment>" is used to enclose all the nested interactions executed inside arguments of an original call, including the original call itself "<xxmi:originalCall>" and its inner messages "<xxmi:innerCalls>". The following XMI representation elaborates this case.

```
<xxmi:nestedcallfragment xmi:id="nestedcallfragment_0001"
        message="message_0001"
        xxmi:status="start"
/>
    <xxmi:originalCall covered="lifeline_0001" xxmi:status="start"/>
        <!--MessageOccurrency of the original call-->
    <xxmi:originalCall xxmi:status="end"/>
    <xxmi:innerCalls covered="lifeline_0001" xxmi:status="start"/>
        <!--Sequence of interactions that appear in the arguments-->
    <xxmi:innerCalls xxmi:status="end"/>
<xxmi:nestedcallfragment xmi:id="nestedcallfragment_0001"
    xxmi:status="end"/>
```

Chained calls are a set of method calls that can be implemented using a single statement where each call depends on an object returned by its preceding one. While visiting statements that involve a chain of calls, Polyglot's visitor visits that calls from right to left. An example in which there are three subsequent method calls is shown below.

A.method1( )method2( )method3( )

In this case, Polyglot firstly visits method3, then method2, and finally method1, while the actual scenario is executed in an opposite direction. This means that this order is also preserved in an XML file generated by the information collector. Therefore, a methodology is provided in this implementation that can parse the chained calls in their correct order.

The set of chained calls is represented in the extended XMI of a sequence diagram in this implementation using a vertical bar on which all correlated calls in the chain lie. This bar is represented by a new element called "<xxmi:chaincallbar>" which encompasses all calls of the chain call. The order of these call depends on their execution from left to right. The first call returns an anonymous object used to call the second call. Then, in a similar manner, the second returns an anonymous object used to call its following call. If there are more calls in the chain call, similar operations are repeated.

```
<xxmi:chaincallbar xmi:id="chaincallbar_0001" covered="lifeline_0001"
xxmi:status="start"
/>
<!--Sequence of interactions along the vertical chain bar-->
<xxmi:chaincallbar xmi:id="chaincallbar_0001" xxmi:status="end"/>
```

For each message appearing inside this bar, an attribute is added that indicates at which bar this message lies. The name of this attribute is "xxmi:chainBar" and its value contains an "ID" of the chain bar where this message appears. If a given message does not relate to any chain bar, then the value of this attribute can be empty.

Loops, options, and alternatives can be represented in the standard XMI using an element called "<CombinedFragment>". This element is divided into operands, where each operand involves two sections where one is for the guard specification(s), and the other is for interactions executed inside a block of the operand. Text-oriented specifications can be used for guards. However, if the specification is based on method calls, then it is necessary to extend its element representation so as to contain messages which reflect occurrences of these calls. Therefore, the guard specification element is extended to hold this kind of message-oriented specification. Here, an example is shown below regarding a "for" loop.

for(int i=0; isTrue( ) increment( ) { }

This "for" loop can be represented as follows.

```
<fragment xmi:id="fragment_0001"
    xmi:type="uml:CombinedFragment"
    name="loop:For" covered="lifeline_0001
    lifeline_0002"
    interactionOperator="loop"
    xxmi:file="C:\tests\cases\Sample.java"
    xxmi:posStart="18" xxmi:posEnd="18"
>
<operand xmi:id="fragment_0001.operand_0001"
        name="operand.operand_0001"
        xmi:type="uml:InteractionOperand"
        xxmi:type="Body"
        xxmi:value" "
        covered="lifeline_0001 lifeline_0002"
>
    <guard xmi:id="fragment_0001.operand_0001.guard_0001"
        name="guard.guard_0001"
        xmi:type="uml:InteractionConstraint"
    >
<!------ Initialization part ------->
<specification xmi:id="fragment_0001.operand_0000.guard_0001.
    specification_0001" xmi:type="Init" value="int i = 0" covered=" "
>
        <fragment xmi:type="xuml:VarOccurrenceSpecification"
            xmi:id="varOccur_0001"
            event="defaultEventOfVarOccurrency" var="var_0001"
            covered="lifeline_0001"
            xxmi:status="start"
        />
        <fragment event="defaultEventOfVarOccurrency"
            var="var_0003"
            xxmi:status="end"/>
</specification>
<!------ Condition part ------->
<specification xmi:id="fragment_0001.operand_0000.guard_0001.
    specification_0002" xmi:type="uml:LiteralString"
value="this.isTrue( )"
    covered="lifeline_0001"
>
        <fragment xmi:id="messageSendOccur_0001"
            xmi:type="uml:MessageOccurrenceSpecification"
            event="defaultEventOfMessageOccurrency"
            message="message_0001" covered="lifeline_0001"
        />
        <fragment xmi:id="messageReceiveOccur_0001"
            xmi:type="uml:MessageOccurrenceSpecification"
            event="defaultEventOfMessageOccurrency"
            message="message_0001" covered="lifeline_0002"
        />
</specification>
<!------ Iterative part ------->
<specification xmi:id="fragment_0001.operand_0000.guard_0001.
    specification_0003"
    xmi:type="Iters"
    value="this.increment( )" covered=" "
>
        <fragment xmi:id="messageSendOccur_0002"
            xmi:type="uml:MessageOccurrenceSpecification"
            event="defaultEventOfMessageOccurrency"
            message="message_0002" covered="lifeline_0001"
        />
</specification>
</guard>
<!--Inner sequence of Variable and Message Occurrences &
CombinedFragments-->
</operand>
</fragment>
```

This "for" loop contains one operand consisting of two parts which are a guard and interactions. The guard consists of three specifications of initialization, condition, and iteration. The initialization part has an occurrence of a variable declaration of "int I". The condition part has a message representing a call to "isTrue( )" which in turn triggers a return message. The last part is the iteration part used for incrementing/decrementing "I" using a method call "this-.increment( )". Then, messages representing method calls inside the "for" loop are placed between the closing tag of the guard and the closing tag of the operand. It should be noted that alternatives (e.g., "switch" or "if" with else part(s)) contain more than one operand where each operand contains a single specification which is a condition.

Recursive calls can be considered important components of program interactions that need to be effectively handled. If the recursive calls are ignored, this may lead to analysis operations of computer programs to infinite loops, and this may eventually lead to Stack Overflow exceptions. Therefore, capturing the existence of recursive calls can be necessary for resolving this issue as well as increasing program understandability.

In this implementation, a Hashmap can be maintained to preserve the signature of each invoked method call that has an execution body (it is removed from the Hashmap once it finishes its execution). During the execution of such a method call, if a method call matches its signature, then the first called method can be considered to be recursive, and this implementation points to its ID in a new call to the called method. The resulting XMI representation explains this scenario by having an attribute to each message called "xxmi:isRecursive". A value of this attribute is set to "Yes" if the message is recursive (i.e., there is another call to it while it is under execution) and "No" otherwise. For any message which invokes that recursive message, an ID is assigned to the message and stored in a new attribute of "xxmi:recursiveMessageId". This implementation includes another attribute for message elements, that is, "xxmi:returnType". This attribute holds a type of a returned value of the message. Here is an example.

```
1        void main(String args[ ]){
2            direct_recursive(5);
3        }
4        void direct_recursive(int i){
5            if(i > 0)
6                direct_recursive(i-1);
7        }
```

This example represents a case in which a recursive call is direct, and this means that it occurs inside the method itself.

```
<message xmi:id="message_0001"
    messageSort="synchCall"
    name="direct_recursive(5)"
    xxmi:isRecursive="Yes"
    sendEvent="messageSendOccur_0001"
    receiveEvent="messageReceiveOccur_0001"
    xxmi:chainBar=" "
    xxmi:recursiveMessageId=" "
    xxmi:returnType=" "
    xxmi:file="C:\tests\cases\Sample.java"
    xxmi:posStart="7" xxmi:posEnd="7"
/>
<message xmi:id="message_0002"
    messageSort="synchCall"
    name="direct_recursive(i-1)"
    xxmi:isRecursive="No"
    sendEvent="messageSendOccur_0002"
    receiveEvent="messageReceiveOccur_0002"
    xxmi:chainBar=" "
    xxmi:recursiveMessageId="message_0001"
```

```
    xxmi:returnType=" "
    xxmi:file="C:\tests\cases\Sample.java"
    xxmi:posStart="26" xxmi:posEnd="26"
/>
```

It can also happen that invocation to a recursive call occurs from outside the body of the currently executing method. The following example demonstrates this case.

```
1        void main(String args[ ]){
2            indirect_recursive(5);
3        }
4        void indirect_recursive(int i){
5            if(i > 0)
6                another_method(i);
7        }
8        void another_method(int i){
9            indirect_recursive(i-1);
10       }
```

This kind of mutual recursion can also be captured by this implementation and represented using the same extended XMI notation demonstrated above which employs a reference to the first invocation of a recursive call in other calls when the call occurred while executing the other call.

Documentation comments are represented using an element called "<xxmi:JavaDoc>". This element is generated for each class or method declaration that has a Javadoc comment. These comments are gathered from the source code without any modification since it is intended to parse them during visualization as HTML code. The only two elements that may have a Javadoc elements are "<message>" and "<packagedElement>" of the xmi:type "uml:Class".

```
<xxmi:JavaDoc>
This is the main class/method of the program.
</xxmi:JavaDoc>
```

A visualizer which is a portion of functions of this implementation is used to automatically display a resulting SD which can be represented in an XMI file. The visualizer should take care of several issues such as element positioning, diagram dimensions, and what/how to show/hide.

Before describing a visualization operation, there are available closed/open source tools that either reverse engineer programs or design UML sequence diagrams to investigate their ability to visualize standard XMI representations of SDs. These tools can be downloaded and several tools are listed in table III shown below.

TABLE III

SD visualization tools with their attempts towards visualization

| Tool | Import | Element Drawing | Correct Visualization |
|---|---|---|---|
| ArgoUML v0.34 [22] | X | x | x |
| Altova UModel v.2015 Prof [23] | X | x | x |
| Enterprise Architect v12.0 [24] | X | X | x |
| Modelio v3.4 [25] | X | x | x |
| StarUML v2.5.1 [26] | X | x | x |
| Trace Modeler v1.6.11 [27] | x | x | x |
| Visual Paradigm v12.2 [28] | X | x | x |

Some of these tools may not import standard XMI representations of sequence diagrams in order to visualize their elements. Other tools imported the standard XMIs, identify their elements, and detect errors if any. However, there was a problem concerned with visualization. None of these tools could fully visualize the elements. The main reason for this restriction may be that these tools always use various UML extensions for representing the visualization of diagram elements, for example, coordinates and colors. Consequently, if such extensions are not available, sequence diagrams cannot be visualized in such tools. "Enterprise Architect". somewhat visualizes the standard XMI representation; however, elements of the imported diagrams are stacked at the top-left journal of its layout while missing important information and loosing a correct order and direction of messages/lifelines.

Due to these limitations of the existing tools, it could be understood that another tool may be preferable if it is capable of demonstrating and visualizing XMI representations of sequence diagrams, and furthermore, it may be preferable if the XMI representations of sequence diagrams are acceptable for the tool. The tool may be capable of visualizing standard XMIs as well as XMIs that are generated and extended using the reverse engineering approach of this implementation. It should be noted that XMI files which have been extended and generated by other tools can also be visualized by the visualizer of this implementation. This is achieved by the visualizer's ability to parse only standard elements if the file contains other unknown elements (i.e., proprietary extensions generated by other tools are escaped).

This implementation can have ability to capture useful and important information regarding a program control flow and behavior. This information can be extracted as an XMI notation representing sequence diagrams reflecting the behavior of different scenarios of a software intended to be analyzed.

Figure 7:
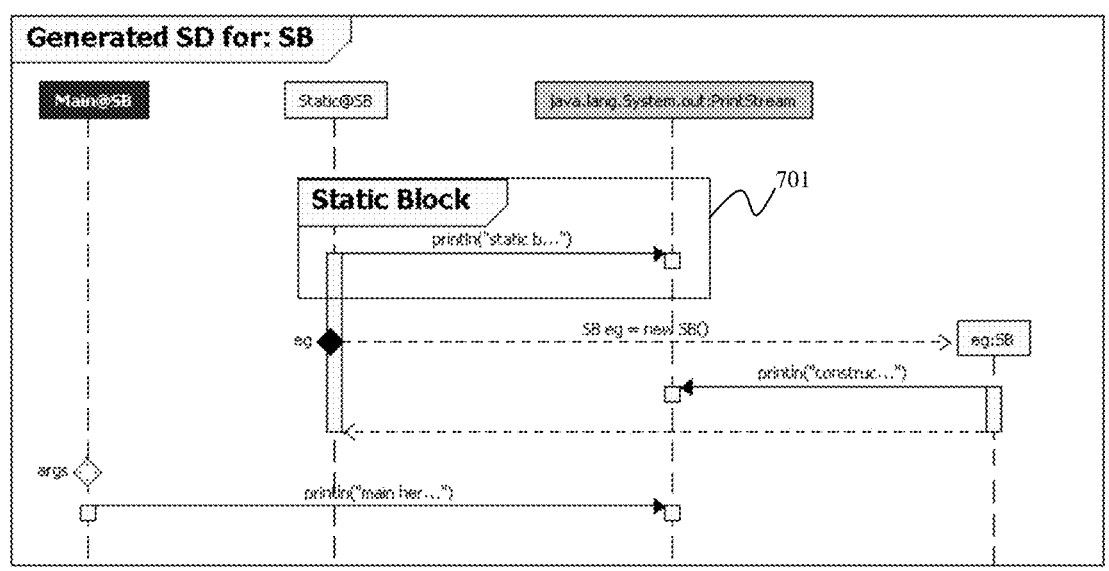
FIG. 7 is a flowchart showing a standalone lifeline for analysis of an initialization operation inside a static block.

In order to distinguish an interaction executed throughout an initialization process, this implementation has a stand-alone lifeline that is responsible for sending/receiving interaction messages to other lifelines. In FIG. 7, a lifeline used for this task is named "Static@SB", where SB is the name of a main class of the target program to be analyzed. It can also be seen that interactions of the static lifeline starts before the interactions of "Main@SB" lifeline which is concerned with interactions executed in the main method of the program.

Interactions used for static initialization are divided into two categories, one is executed inside a static block (FIG. 7, 701), and the other is executed in response to initialization of member variables. The static block is shown as an enclosing box containing all interaction messages (or fragments if any) executed therein.

Figure 8:
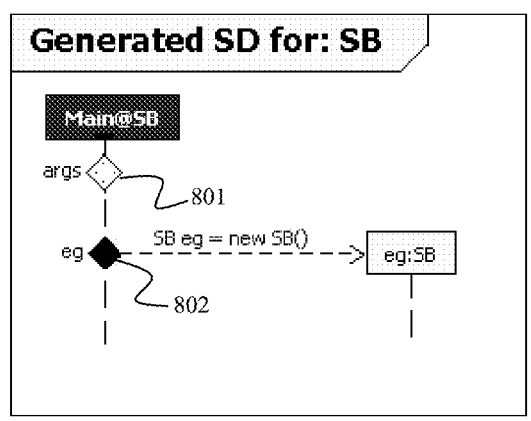
FIG. 8 is a flowchart showing a declaration/updating operation of variables.

Declarations of variables can be used in a resulting SD. It may be useful if users can see in a message or loop a reference to a variable with information for notifying where this variable is declared and/or has been assigned a value in a computer program. Therefore, this implementation has two new elements which show declarations of variables in lifelines where these variables are declared. The first element that appears in a plain diamond (801) as shown in FIG. 8 and is used to represent the variables that are declared inside the method's arguments. The other element is shown with a black-filled diamond (802) to demonstrate declarations of local and member variables.

The extended XMI of this implementation also contains information of assignment statements used to assign values for any variables or change their current values. Such information of this implementation can be shown on a computer screen through, for example, a mouse hovering feature.

In a standard SD, there are two kinds of lifelines that differentiate between objects and classes. Both of them have the same element style, and the difference appears within the label. Object lifelines are represented in a form, for example, as shown below.

"<Object Name>:<Class_Type_Name>"

In this example, class labels are represented in a form of "<Class_Type_Name>". There is a special case where the object is anonymous (or default), which can be created using a statement like "new A( ).m1( )" which creates single-use objects. In this case, lifeline labels would be of a form of ":<Class_Type_Name>" in which the object name is omitted.

The extension of this implementation distinguishes the interactions of any computer programs that represent communications between the program's internal objects and classes themselves as well as communication between them and other entities of the system. This may allow users to recognize the amount of interactions of the computer program with the language or system libraries or components. In particular, the extension of this implementation distinguishes the program accesses to a system console, file system and GUI. This could be identified from the language-supported libraries that allow the computer programs to interact with these external entities.

Figure 9:
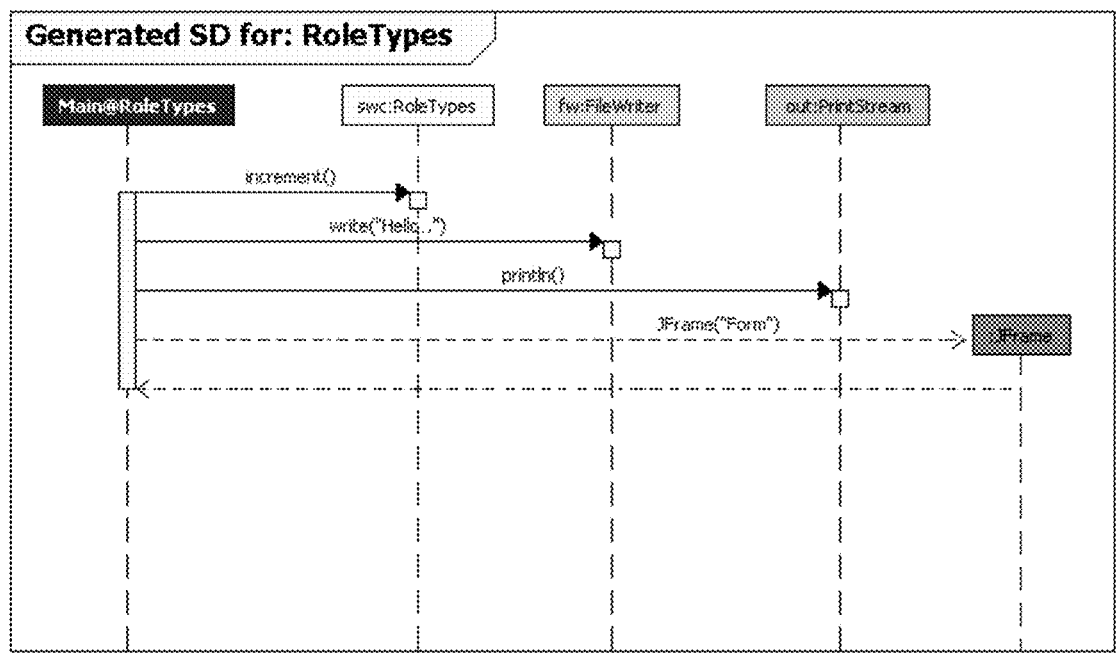
FIG. 9 is an example of an output provided by a prototype implementation.

In FIG. 9, in this implementation, different lifeline colors can be applied to different types of objects. For example, a lifeline that represents the 'Main' method can be colored black and use the symbol "@" attached to the name of the main class which contains this method. Lifelines representing objects that relate to the FileSystem, SystemConsole, and GUI are represented using certain notations. In this implementation, different colors can be used to distinguish the lifelines of different categories. In FIG. 9, for example, "FileWriter" which outputs "Hello . . . " and write these characters into a file can be shown in green, and "PrintStream" which displays a sequence of information on a screen can be yellow. Other types of lifelines can be drawn using, for example, cyan. These colors can be changed/selected for different icons, and this may intuitively reflect a main purpose of a corresponding lifeline. This extension may also enable users to hide interactions of a certain type of lifelines if they are not important for understanding the program behavior. In addition, a function which shows only interactions between programs and these lifelines may be useful for the users who would like to look into these interactions.

This implementation includes a visualizing function of nested calls. Before explaining the implementation, when using standard SD elements (i.e., messages), there may be at least two different ways for providing a function of visualizing such calls. The first way is to show inner calls (i.e., calls inside parameters) using separate message elements as shown in (a) of FIG. 10. As shown, (a) shows three classes including a main class, wherein the main class issues calls. As shown in (b) of FIG. 10, another way is to show only an original call with a label which indicates that it contains other calls inside its parameters (i.e., without showing separate message lines) as shown in (a) of FIG. 10. In (b), three parameters are included in "m1", and two of them are calls. However, neither way exactly reflects what is actually represented in the source code because the execution body of the inner calls might contain lots of important interactions in the computer program. Therefore, this implementation includes a new SD element which can represent these kind of calls in an intuitive manner.

Figure 10A:
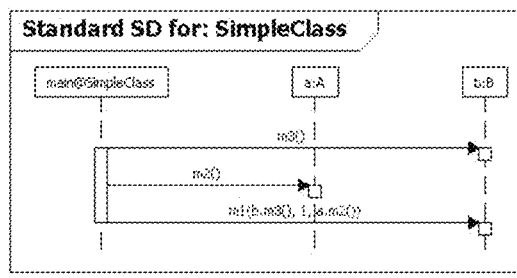
FIG. 10(a) shows an example of visualized output of nested calls (Standard SD elements 1).
Figure 10B:
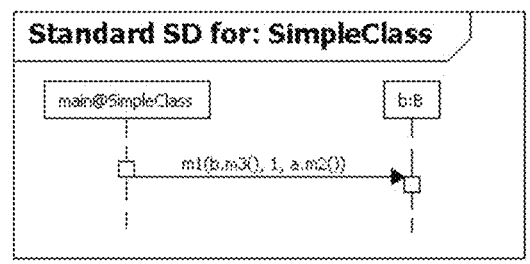
FIG. 10(b) shows an example of visualized output of nested calls (Standard SD elements 2).
Figure 10C:
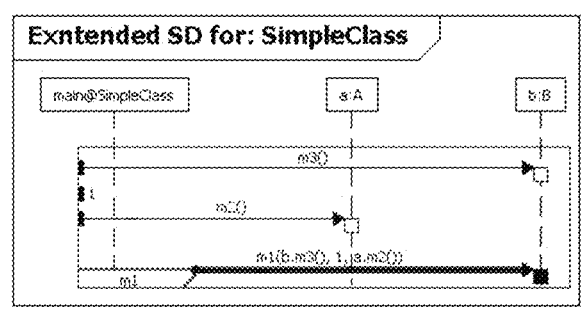
FIG. 10(c) shows an example of visualized output of nested calls (Extended SD elements).

Here is one example of a calling operation shown below.
b.m1(b.m3( ) 1, a.m2( ));

As shown in (c) of FIG. 10, in this example, through the object "b" that is of type "B", there is a call to the method "m1". The first parameter in this method invocation is another call to a method "m3" from the same object, the second parameter is a constant value, and the last parameter is also a call to a method called "m2" from another object called "a" of type "A". Visualization elements of this implementation could manage the representation of such a call by having "A call box" which represents the original call by a bold message line while showing all its parameters as small filled rectangles lying at the left side. The parameters are shown as if they are a constant value or a variable. In the case of a parameter with a method call, thinner message lines can be drawn approaching the corresponding lifeline of an owner object of that method. If the body of that method has multiple interactions, then all of them may also appear inside the call box.

As discussed earlier in this section, each method in a nested call statement returns an anonymous object that can be used to call a next method until reaching the ultimate call that returns the final result. As shown in (a) of FIG. 11, the statement "a.m2( )substring(2).trim( )" uses three different lifelines for visualizing three messages invoked through the statement. This may confuse the user since it may suggest indication of the presence of three separate method calls in this program. This implementation provides representation of such a call which can show statement calls in a way that is identical to their structure in the source code.

Figure 11A:
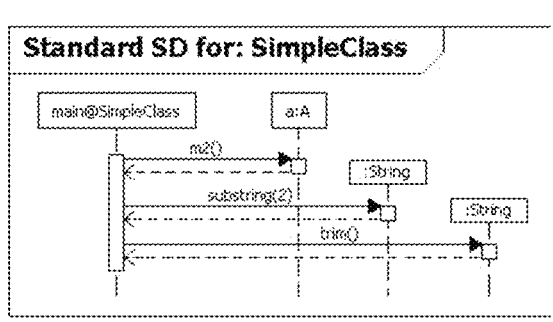
FIG. 11(a) shows an example of visualized output of chained calls (standard).
Figure 11B:
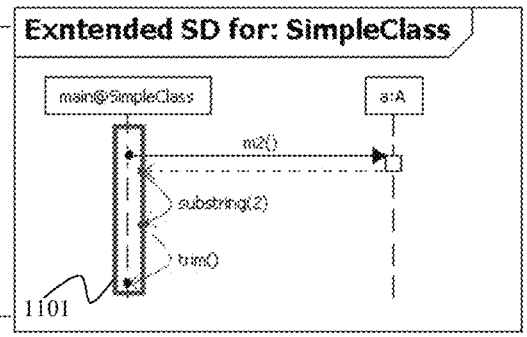
FIG. 11(b) shows an example of visualized output of chained calls (extended).

In FIG. 11, (b) shows notation of this implementation for representing chained calls, and this is provided as an extension applied to the UML SD representation. There is a red vertical bar 1101 which can be displayed in, for example, red that holds all messages executed within a single statement of chained calls. This bar starts with a message which represents a method that is directly connected to the first object used for initiating this kind of calls (i.e., the method "m2" of the object "a"). Then, after executing "m2", the method returns an object to the same vertical bar which in turn triggers a next message "substring" with an integer parameter of "2". Likewise, after executing "substring", another object is returned to the bar to be eventually used to call the last method called "trim" from which a value is returned to the lifeline/bar which has initiated the entire set of calls.

Figures 12A, 12B:
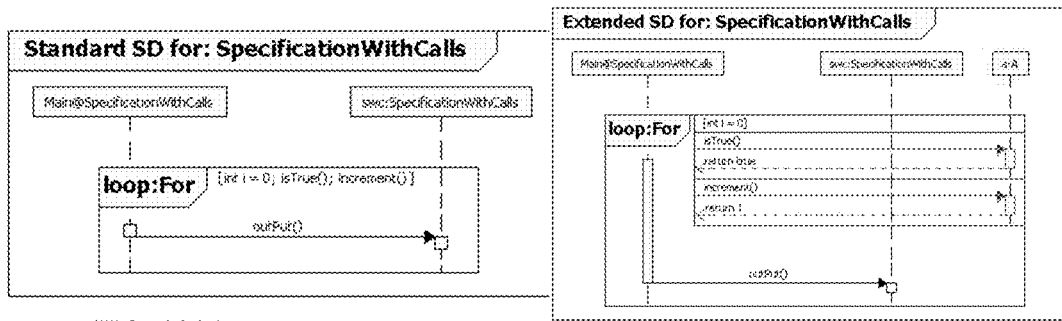
FIG. 12(a) shows an example of visualized output of a for-loop including method calls (standard).
FIG. 12(b) shows an example of visualized output of a for-loop including method calls (extended).

For a case of having loops, optional or alternative clauses where their specification (i.e., their condition or iteration parts) is composed of a method call (and of course this call may trigger other calls inside a body of a used method), standard SDs cannot show these internal calls, as shown in (a) of FIG. 12. Displaying these calls on a screen may make a displayed SD complicated. On the other hand, there is possibility that users may be interested in these calls.

(a) of FIG. 12 shows an extension of this implementation which includes combined fragments that can be used in UML 2.0 for representing interactions executed within a block. In (b) of FIG. 12, the extended SD notations can show all interactions executed throughout execution of a "for" loop whose condition ("isTrue") and iteration ("increment") parts are based on method calls. Although the standard SD is simple and easy to read, lots of information is hidden from the user. In order to support the simplicity of such extension, this implementation may allow this kind of information to be hidden in a certain level of zooming.

Figure 13:
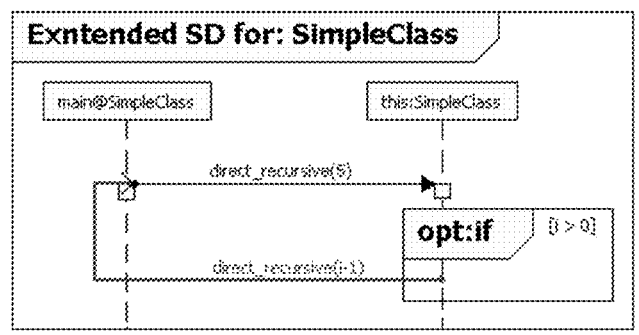
FIG. 13 shows an example of visualized output of a recursive call.

With respect to recursive calls, the UML standard of sequence diagrams represents them as self-messages. This means that the user tracks any self-messages and checks whether or not they are under execution in order to identify whether or not they are recursive. If recursion appears within the same method, it may be possible for the user to detect this recursion. However, in the case of an indirect recursion, for example, recursion with methods of different classes, the UML standard may represent this case using a normal message line. Therefore, this implementation provides an extension which can expressively represent a case as shown in FIG. 13. FIG. 13 shows a case in which a recursive call (direct_recursive) is demonstrated using a turnaround line with a new argument (i-1) passed to that method (direct_recursive). It should be noted that a label of the first message to the recursive method refers to the parameter of the first invocation but that does not mean that these parameters are always sent to that method.

An extension of this implementation can be used to provide further information about, for example, lifelines or methods whose exact purpose is unclear through their names. Explanation of classes and methods provided in the source code as Javadoc comments can be referred to. Here, this implementation allows users to show HTML-based Javadoc comments in a SD layout in two different ways. The first way is by hovering among a particular element intended to know more information. The other way is using the biggest zooming level that will show all information regarding elements in the layout.

Figure 14:
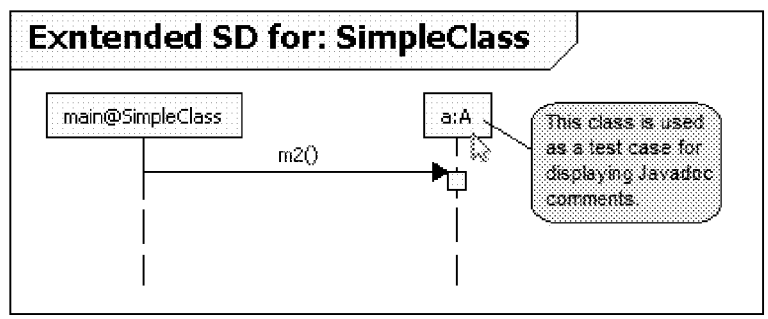
FIG. 14 shows an example of visualized output of Javadoc comments.

FIG. 14 shows an example of an operation displaying Javadoc comments of class "A" corresponding to a shown lifeline in the SD layout as a pop-up tooltip when hovering a mouse by a user among an area of that lifeline.

This implementation includes a function applied to a visualization process of determining coordinates of a SD of lifelines. Lifeline positioning can be addressed from different aspects as shown below.

a) Objects of the same class can be located near each other.

b) Classes of the same package can be located near each other.

c) Classes and objects that have more interactions can be located close to each other regardless of where they are located in a source code.

Diagram dimensions should be relative to different factors. It may be preferable for users if an easy and understandable diagram could be created because they may be readable for users. Visualization of dimensions is relative to a computer screen and resolution. In addition, the number of lifelines, fragments, and messages used in the diagram may also play a role in defining proper dimensions of the resulting diagram. Furthermore, it may be preferable for users to provide a visualizer having a zooming facility that enables the users to select desired dimensions applied to their vision.

In this implementation, operations of zooming in/out depends on a set of predefined templates of levels that regulate information regarding demonstration of the produced SD. In other words, zooming-in to 150% would show more information than that with 100%, while zooming-out to 50% would reduce the amount of information which the user can see. Therefore, in these templates, it is possible to specify the information intended to be shown/hidden whenever a user attempts to zoom in/out. In addition, the visualizer can provide users with a function which can allow the users to choose certain lifelines to be visualized (i.e., shading in/out). This may help users when focusing on only interactions between those lifelines while other information is omitted, shaded-out, or decreased in size.

The visualizer of this implementation may also provide extra options that allow users to select the desired elements to be displayed. For instance, a user may prefer to zoom-in to 150% and, at the same time, he/she does not want to see interactions with external lifelines. Hence, providing such options may assist the user.

Determination of what to show and what to hide may be based on similar factors as the ones used for dimension specification. This means that the amount of information to be displayed participates in deciding what information to show/hide. For example, an SD for a small computer program can show self-interactions that show messages from a certain lifeline to itself, while for larger computer programs such interactions may be hidden.

In this implementation, some hidden information can be displayed on-demand using a mouse hovering facility. This means that the user can point out at an area of a certain element in a SD layout to see more information regarding the element (e.g., Javadoc comments).

In operations of re-engineering of software projects, a visualizer can support accessing a source code of any items in a displayed SD. This includes declarations, calls, and control structures.

Figure 15:
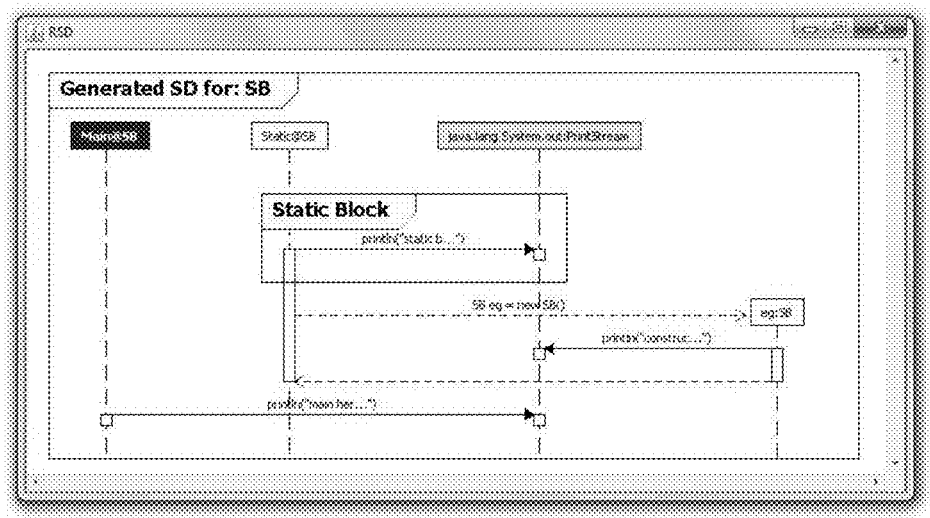
FIG. 15 shows an example of a visualizer's output.

A prototype of this implementation is deployed as a Java executable Jar application that can run under any environment and may optionally be fully integrated with the other techniques described herein, for example, functions of collecting program information and tracing program interactions. Therefore, in order to consider a Java project, before visualization, a user may manually run the above-described technique of collecting and tracing operations, specify the project path, and generate an XMI file(s) representing all trace information. Then through the visualizer, the user can open that XMI file and everything can be displayed in a visual layout. A snapshot of the prototype is shown in FIG. 15.

Implementation of the above-described approach, that is, implementation as an extension of a Java compiler, may facilitate its application to any open-source projects. A Java extension of this implementation was created as an independent Jar file that can be utilized for compiling Java programs. The Jar file also contains the base Polyglot compiler as it handles the execution of this extension.

In order to simplify application of the above-described approach, a script in a form of shell/bat file was created to be used as a compiler. In other words, users are not required tpuse a typical Java compiler (i.e., Javac). Instead, a "java" program can be used to compile computer programs using a compiler of this implementation. The user can run a script to execute a main class file of the extended compiler, and the extended compiler supplies an intended Java project as an argument. Besides, class paths of the base Polyglot compiler and the extension of this implementation can be provided as options. This may enable compilation of a project using the extension of this implementation and generate corresponding .class files as well as an XML file containing its AST.

This approach may have objectives, and one of them may be to perform a static analysis of program interactions and control flow and then visualize them in an easy to comprehend, scalable, meaningful, and interactive diagrams.

Other potential applications of the above-described proposal may include, for example, code transformation, software refactoring and deducing software metrics. In the above-described proposal, the output generated for each computer program may contain various information used for analyzing the computer program and expressed and divided into XML elements and attributes. Therefore, it may be useful for the users when, for example, the users transform the source code of the computer programs from Java to any other languages since the whole architecture of the computer program is provided in the output. It can also be useful to conduct, for example, refactoring operations using proper XPath queries to detect clones. Furthermore, by means of well-created XPath queries, it may be possible for the users to calculate different software metrics that are used for software evaluation.

The above-described embodiment/implementation can be an extension of Polyglot which is a Java compiler and supports reverse engineering operations of Java programs. The approach includes a static analysis of a source code to collect as much useful information of computer programs as possible. While capturing program information, represented by a set of AST nodes, a log file is generated representing an entire architecture of a target Java project to be analyzed. This log file is stored as an XML representation. In other words, by tracing program interactions using queries and graphically and automatically visualizing and distributing diagram elements, the above-described embodiment/implementation can support future manipulation and investigation of the analyzed programs.

Figure 16:
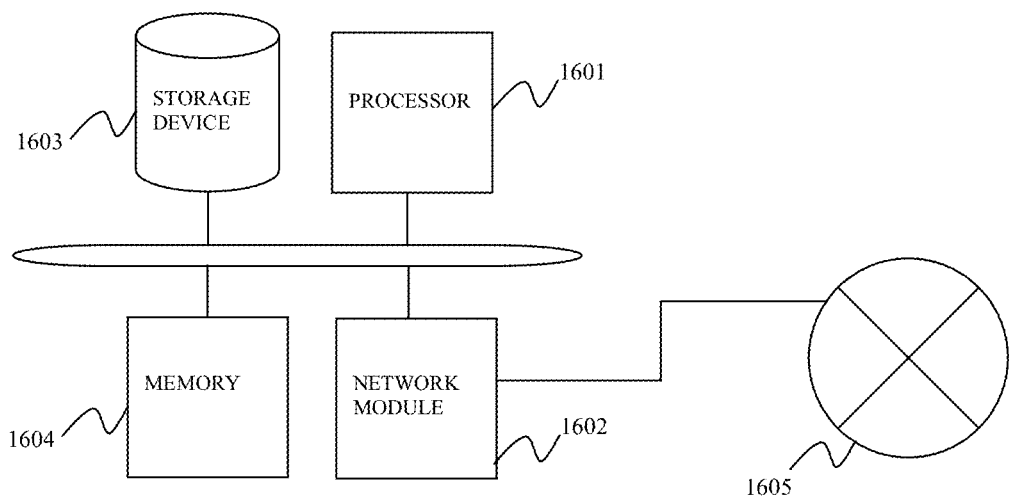
FIG. 16 shows an overview hardware constitution.
Figure 17:
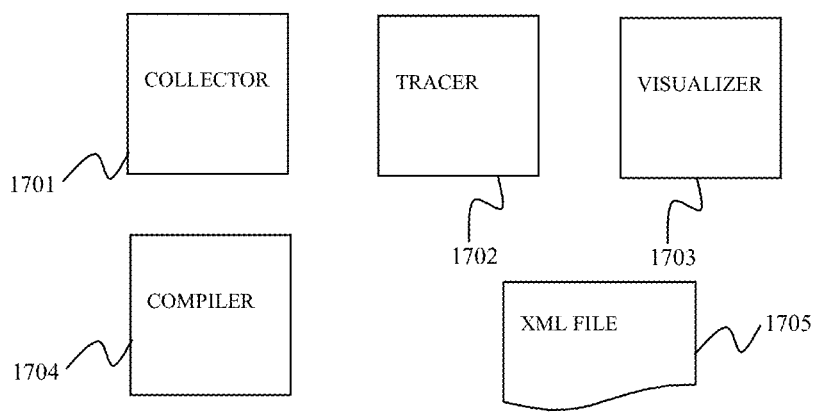
FIG. 17 shows software components.

The above-described embodiment and proposal can be implemented on, for example, a computer system such as that shown in FIG. 16 or a system that comprises one or more of the components of the system shown in FIG. 16, alone or in combination with one or more other systems. 1601 is a processor that preferably contains circuitry configured to carry out or perform one or more of the functions or tasks mentioned for the implementations described hereinabove. 1602 is a network module. 1603 is a storage device, for example, a hard disk. 1604 is a memory. 1605 is a network. The memory 1604 and/or storage device 1603 may include software components of the above-described embodiment or proposal as shown in FIG. 17. 1701 is a collector. 1702 is a tracer. 1703 is a visualizer. 1704 is a compiler, for example, Polyglot. 1705 is an XML file generated by the tracer 1702 and read by the visualizer 1703. These components can be stored in one or more than one computers, and the above-described embodiment and proposal can be implemented on one or more than one computers. Computer languages are not limited to Java, and for example, it is possible to apply to C++, Objective-C, Ruby, Perl and C#.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A computer-implemented method for reverse-engineering a software code, method or functionality, by collecting and querying source code analysis information comprising:
    collecting, by a processor of a computer, analysis information from a source code of a computer program;
    tracing, by the processor of the computer, by querying the analysis information to determine program behavior starting with a main entry point to produce trace data; and visualizing, by the processor of the computer, the trace data as a sequence diagram,
wherein the trace data comprises a representation corresponding to a sequence diagram of the source code of the computer program,
wherein the tracing traces method calls that cannot be executed due to a program error by referencing the analysis information, and
wherein the collecting includes logging the method calls along with one or more callers and callees.

2. The method according to claim 1, wherein
the analysis information includes log information in a predetermined format,
the collecting includes: parsing the computer program; logging a variable signature when detecting a declaration node; logging a node signature of an inner node when detecting the inner node; logging start/end points of a control structure when detecting the control structure; and logging a signature of a method or constructor call when detecting the method or constructor call.

3. The method according to claim 1, wherein, if there is more than one main entry point in the computer program, at least one main entry point selected by a user is applied to the tracing.

4. The method according to claim 1, wherein the analysis information comprises AST (abstract syntax tree).

5. The method according to claim 1, wherein the analysis information is in an XML (eXtensible Markup Language) format.

6. The method according to claim 1, wherein the collecting is implemented by overriding a compiler source code.

7. The method according to claim 6, wherein the compiler is Polyglot.

8. The method according to claim 1, wherein
the visualizing the trace data as a sequence diagram further includes:
detecting a combined-fragment, then:
drawing a fragment border lying on covered lifelines, getting an operand and corresponding guards, and drawing an inner message; and
detecting a message, then:
drawing a message arrow for a simple message; drawing an arrow pointing for a first occurrence of a complex and recursive message; applying a vertical bar representing time and drawing a participating message for a complex and nested message, a drawing a surrounding border and a participating message for a complex and compound message.

* * * * *